United States Patent
Surnilla et al.

(10) Patent No.: US 9,845,749 B2
(45) Date of Patent: Dec. 19, 2017

(54) SYSTEM AND METHODS FOR DIAGNOSING SOOT ACCUMULATION ON AN EXHAUST GAS RECIRCULATION VALVE

(71) Applicant: Ford Global Technologies, LLC, Dearborn, MI (US)

(72) Inventors: Gopichandra Surnilla, West Bloomfield, MI (US); James Alfred Hilditch, Canton, MI (US); Imtiaz Ali, Lathrup Village, MI (US); Daniel Joseph Styles, Canton, MI (US); Timothy Joseph Clark, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 287 days.

(21) Appl. No.: 14/616,452

(22) Filed: Feb. 6, 2015

(65) Prior Publication Data
US 2016/0230683 A1     Aug. 11, 2016

(51) Int. Cl.
| F02D 41/00 | (2006.01) |
| F02M 26/50 | (2016.01) |
| F02M 26/49 | (2016.01) |
| F02M 26/47 | (2016.01) |
| F02M 35/10 | (2006.01) |

(Continued)

(52) U.S. Cl.
CPC ......... *F02D 41/0072* (2013.01); *F02M 26/08* (2016.02); *F02M 26/47* (2016.02); *F02M 26/49* (2016.02); *F02M 26/50* (2016.02); *F02M 35/10393* (2013.01); *F02D 41/0007* (2013.01); *F02D 41/144* (2013.01); *F02D 41/1448* (2013.01); *F02D 41/1456* (2013.01);
(Continued)

(58) Field of Classification Search
CPC ............. F02D 41/0077; F02D 41/0007; F02D 41/0072; F02M 26/08; F02M 35/10393; F02M 26/47; F02M 26/49; F02M 26/50; F02M 26/48; F02M 26/23
USPC ...................................................... 60/605.2
See application file for complete search history.

(56) References Cited

U.S. PATENT DOCUMENTS

| 5,546,915 A * | 8/1996 | Isobe | F02D 41/0065 |
| | | | 123/568.12 |
| 5,639,961 A * | 6/1997 | Lautenschutz | F02D 35/027 |
| | | | 123/406.48 |

(Continued)

OTHER PUBLICATIONS

Hakeem, M. et al., "Methods and Systems for Determining a Fuel Concentration in Engine Oil Using an Intake Oxygen Sensor," U.S. Appl. No. 14/252,679, filed Apr. 14, 2014, 63 pages.

(Continued)

*Primary Examiner* — Patrick Maines
(74) *Attorney, Agent, or Firm* — Julia Voutyras; McCoy Russell LLP

(57) ABSTRACT

Methods and systems are provided for determining changes in a flow area of an exhaust gas recirculation (EGR) valve for EGR flow estimates due to soot accumulation on the EGR valve. In one example, a method includes indicating soot accumulation on the EGR valve based on a difference in EGR flow estimated with an intake oxygen sensor and with a pressure sensor coupled across the EGR valve. The determination of the difference of the EGR flow estimates may occur when the engine is not boosted.

20 Claims, 6 Drawing Sheets

(51) Int. Cl.
*F02M 26/08* (2016.01)
*F02M 26/23* (2016.01)
*F02M 26/48* (2016.01)
*F02D 41/14* (2006.01)

(52) U.S. Cl.
CPC ......... *F02D 41/1467* (2013.01); *F02M 26/23* (2016.02); *F02M 26/48* (2016.02); *Y02T 10/47* (2013.01)

(56) References Cited

U.S. PATENT DOCUMENTS

| | | |
|---|---|---|
| 6,446,498 B1 | 9/2002 | Schricker et al. |
| 6,742,379 B2 | 6/2004 | Matsubara et al. |
| 6,755,078 B2 | 6/2004 | Hernandez et al. |
| 8,042,528 B2 | 10/2011 | Gates et al. |
| 8,521,354 B2 * | 8/2013 | Sasaki ................. F02D 41/0072 701/29.1 |
| 2006/0272625 A1 * | 12/2006 | Wang ................. F02B 29/0406 123/568.16 |
| 2007/0220864 A1 * | 9/2007 | Haugen ............... F02D 41/0007 60/286 |
| 2009/0082943 A1 * | 3/2009 | Sugiyama ............... F02D 41/26 701/103 |
| 2009/0266055 A1 * | 10/2009 | Guo ........................ F01N 9/002 60/285 |
| 2011/0005503 A1 * | 1/2011 | Harden ............... F02M 25/0702 123/568.12 |
| 2011/0023847 A1 * | 2/2011 | Gates ................. F02D 41/0072 123/568.21 |
| 2011/0184632 A1 | 7/2011 | Kang et al. |
| 2013/0061831 A1 | 3/2013 | Gambhir et al. |
| 2013/0073179 A1 | 3/2013 | Song et al. |
| 2013/0228228 A1 | 9/2013 | Akahane et al. |
| 2014/0251285 A1 | 9/2014 | Surnilla et al. |
| 2014/0290239 A1 * | 10/2014 | Akita .................. F02D 41/0077 60/602 |
| 2015/0053186 A1 | 2/2015 | Surnilla et al. |
| 2015/0075502 A1 | 3/2015 | Surnilla et al. |
| 2015/0075503 A1 | 3/2015 | Surnilla et al. |
| 2015/0101564 A1 | 4/2015 | Surnilla et al. |
| 2015/0113948 A1 | 4/2015 | Surnilla et al. |
| 2015/0128916 A1 | 5/2015 | Surnilla et al. |
| 2016/0215716 A1 * | 7/2016 | Yamamoto .......... F02D 41/1458 |
| 2016/0230684 A1 * | 8/2016 | Surnilla .............. F02D 41/0077 |

OTHER PUBLICATIONS

Surnilla, G. et al., "Methods and Systems for Adjusting EGR Based on an Impact of PCV Hyrdrocarbons on an Intake Oxygen Sensor," U.S. Appl. No. 14/252,693, filed Apr. 14, 2014, 63 pages.

Styles, D. et al., "Method for Estimating Charge Air Cooler Condensation Storage with an Intake Oxygen Sensor while Exhaust Gas Recirculation Is Flowing," U.S. Appl. No. 14/192,765, filed Feb. 27, 2015, 49 pages.

Hagner, D. et al., "System and Methods for Adjusting an Exhaust Gas Recirculation Valve Based on Multiple Sensor Outputs," U.S. Appl. No. 14/616,354, filed Feb. 6, 2015, 64 pages.

Surnilla, G. et al., "System and Methods for Operating an Exhaust Gas Recirculation Valve Based on a Temperature Difference of the Valve," U.S. Appl. No. 14/616,496, filed Feb. 6, 2015, 67 pages.

* cited by examiner

SYSTEM AND METHODS FOR DIAGNOSING SOOT ACCUMULATION ON AN EXHAUST GAS RECIRCULATION VALVE

FIELD

The present description relates generally to methods and systems for an exhaust gas recirculation system of an internal combustion engine.

BACKGROUND/SUMMARY

Engine systems may utilize recirculation of exhaust gas from an engine exhaust system to an engine intake system (intake passage), a process referred to as exhaust gas recirculation (EGR), to reduce regulated emissions and improve fuel economy. An EGR system, such as a low-pressure EGR system, may include various sensors to measure and/or control the EGR. As one example, an engine intake system may include an intake gas constituent sensor, such as an oxygen sensor, which may be employed during non-EGR conditions to determine the oxygen content of fresh intake air. During EGR conditions, the sensor may be used to infer EGR based on a change in oxygen concentration due to addition of EGR as a diluent. One example of such an intake oxygen sensor is shown by Matsubara et al. in U.S. Pat. No. 6,742,379. However, the accuracy of EGR estimates using the intake oxygen sensor may be reduced during boosted engine operation and purge conditions when hydrocarbons are flowing through the intake system. EGR flow may then be estimated using alternate EGR sensors. For example, the EGR system may also include differential pressure over valve (DP) sensor positioned around an EGR valve for estimating EGR flow based on a pressure difference across the EGR valve and a flow area of the EGR valve. EGR flow estimates may then be used to adjust a position of the EGR valve and therefore adjust an amount of EGR provided to the engine.

As one example, a flow area of the EGR valve may change due to soot accumulation, or other build-up, on the EGR valve. This change in EGR valve flow area may impact the EGR flow estimate, and thus EGR control, based on measurements from a DPOV system including the DP sensor. However, the inventors herein have recognized that when the EGR valve closes, an edge of the valve may cut into the valve seat and changes in valve lift due to soot build-up may not be detected. Thus, changes in the EGR valve flow area affecting EGR flow may not be compensated for with end-stop learning diagnostics using the DPOV position sensor, thereby resulting in inaccurate EGR flow estimates when using the DPOV system.

In one example, the issues described above may be addressed by a method for indicating soot accumulation on an exhaust gas recirculation (EGR) valve based on a difference in EGR flow estimated, during a first condition when the engine is not boosted, with an intake oxygen sensor and with a pressure sensor coupled across the EGR valve. In this way, changes in a flow area of the EGR valve due to soot accumulation may be detected and subsequent EGR flow estimates may be corrected based on the soot accumulation, thereby increasing an accuracy of EGR flow estimates and resulting engine control.

As one example, a first EGR flow estimate may be determined using an intake oxygen sensor when the engine is not boosted and purge flow is off. A second EGR flow estimate may be determined with a pressure sensor coupled across the EGR valve, such as a differential pressure over valve (DP) sensor. The difference between the first and second EGR flow estimates may then be used to determine a change in flow area of the EGR valve due to soot accumulation. More specifically, the second EGR flow estimate may be based on an output of the DP sensor and the flow area of the EGR valve, where the flow area of the EGR valve is estimated based on a known cross-section of the EGR valve and an EGR valve position based on an output of an EGR valve position sensor. The change in EGR valve flow area (due to soot build-up) may then be based on the difference in the first and second EGR flow estimates, an expected EGR valve flow area, and a first EGR flow estimated with the intake oxygen sensor. The expected EGR valve flow area may be based on an output of the EGR valve position sensor and an EGR valve lift correction, where the EGR valve lift correction is learned during an EGR valve end stop and thermal compensation learning routine. In one example, the EGR valve ends stop and thermal compensation learning routine may determine a change in flow are of the EGR valve due to a temperature difference between the stem and body of the EGR valve. In this way, changes in EGR valve flow area affecting EGR flow estimates using the DPOV method described above may be determined and used to correct EGR flow estimates. In this way, more accurate EGR flow estimates may be used for engine control.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
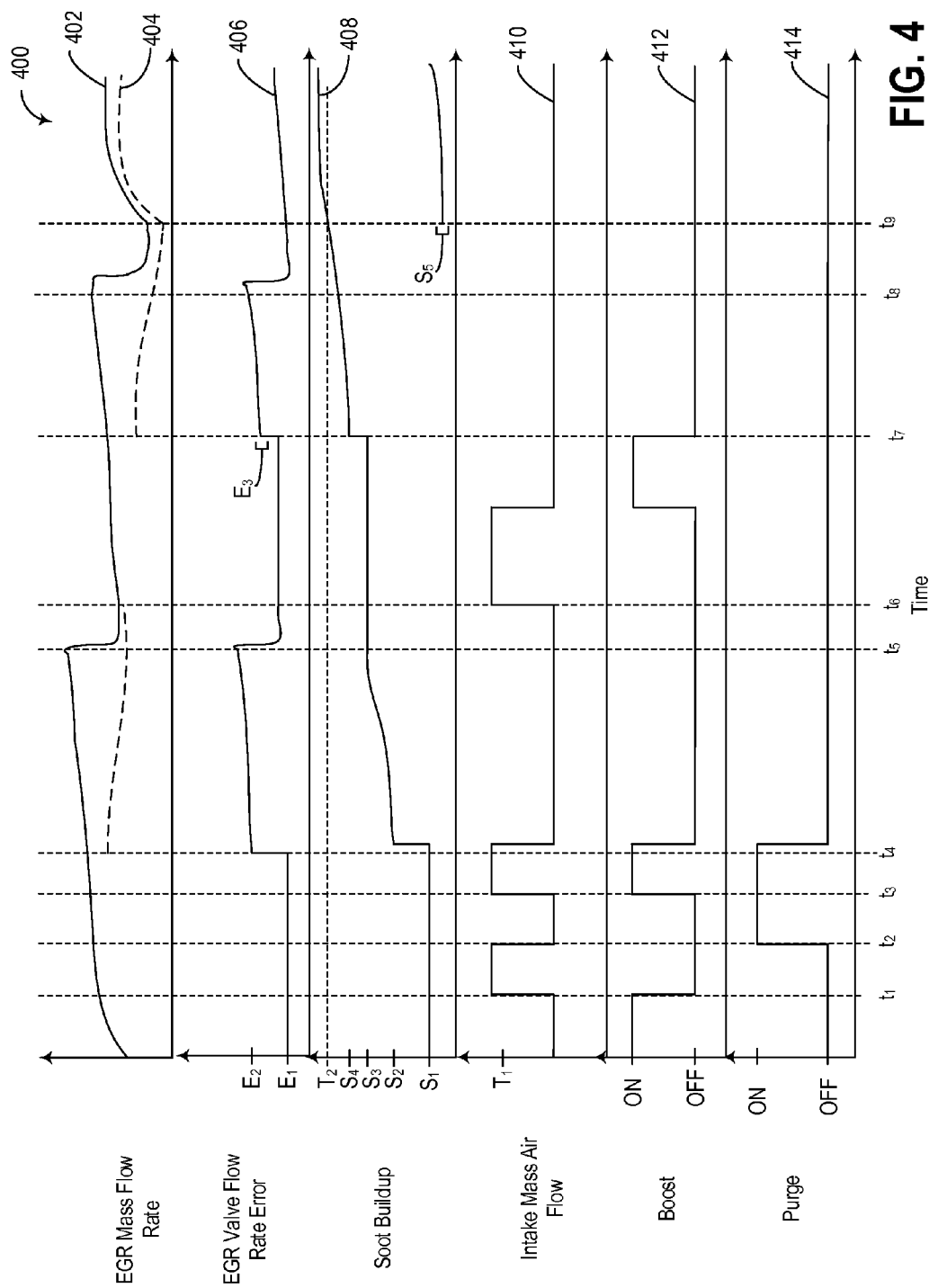
FIG. 4 is a graph illustrating changes in EGR flow estimates using an intake oxygen sensor and differential pressure sensor under varying engine operating conditions.

The following description relates to systems and methods for determining changes in a flow area of an exhaust gas recirculation (EGR) valve for EGR flow estimates. In one example, the changes in flow area of the EGR valve may be due to soot accumulation on the EGR valve and/or a change in temperature difference between a stem and body of the EGR valve. A turbocharged engine, as shown in FIG. 1, may include an intake oxygen sensor located in an intake passage of the engine and a differential pressure over valve (DP)

sensor located in an EGR passage. The DP sensor and intake oxygen sensor may each be used to give estimates of an EGR flow through a low pressure EGR system. The EGR flow may be regulated by an EGR valve that, when open, may allow exhaust gas to recirculate to an intake passage from downstream of a turbine to upstream of a compressor. As shown in FIG. 4, EGR flow may be estimated using the intake oxygen sensor and/or or the DP sensor based on engine operating conditions. When the EGR valve is open and a EGR is flowing through the EGR passage, a pressure differential across the EGR valve and the size of the opening of the EGR valve may be used to determine the magnitude of the EGR flow. A position sensor may be used to determine an EGR valve lift and thus estimate the area of the EGR valve opening, and the DP sensor may provide the differential pressure across the EGR valve. As described in FIGS. 5 and 6, the accuracy of the estimate of the EGR valve opening may be increased by accounting for the thermal expansion of the EGR valve as a result of high EGR temperatures. Thus, taken together, measurements from an EGR valve position sensor and a DP sensor may be used to provide an estimate of the EGR mass air flow. Over time however, soot may accumulate on the EGR valve and decrease the effective flow area of the valve opening. Without a method for estimating soot buildup, EGR flow estimates may become increasingly inaccurate as more and more soot accumulates on the EGR valve.

Figure 2:
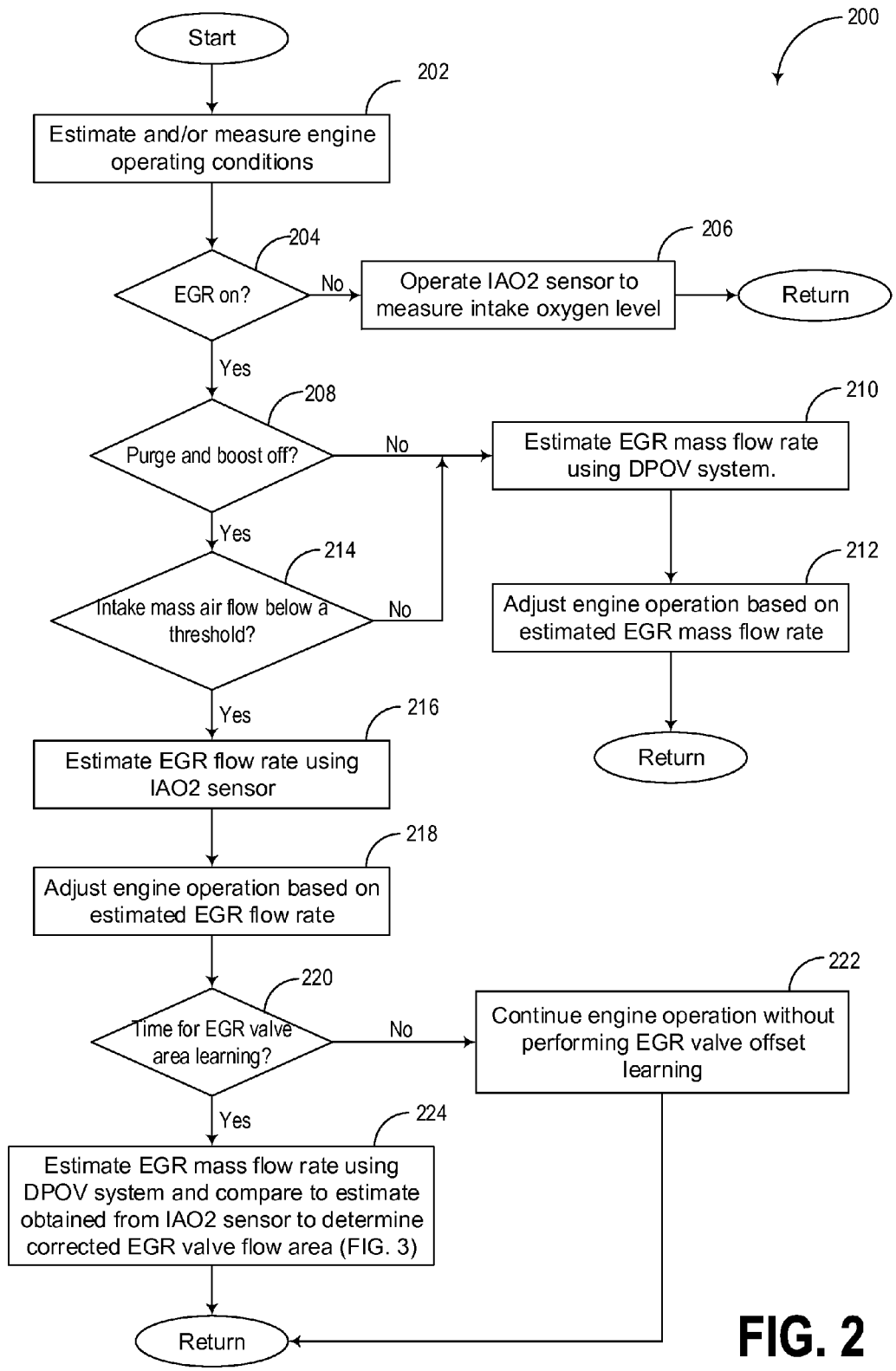
FIG. 2 is a flow chart of a method for estimating EGR flow with an intake oxygen sensor or differential pressure sensor based on engine operating conditions.
Figure 3:
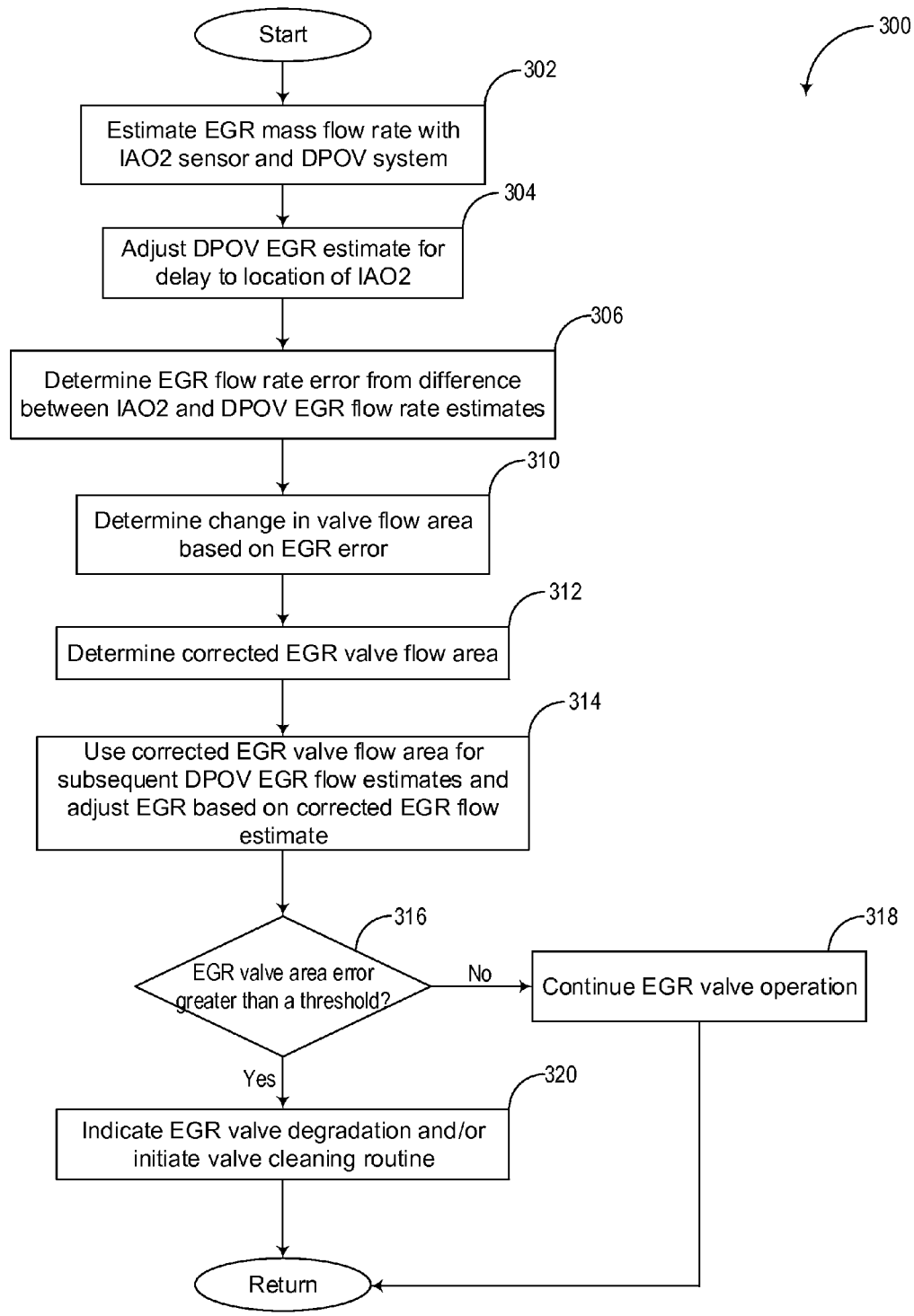
FIG. 3 is a flow chart of a method for indicating soot accumulation on an EGR valve and determining a corrected EGR valve flow area based on soot accumulation.

As shown in FIG. 2, determining whether to use DPOV intake oxygen sensor measurements (from a DPOV system including a DP sensor across an EGR valve) for estimating EGR flow rates may be based on engine operating parameters such as purge, boost, and intake mass air flow. The method described in FIG. 3 provides a technique for estimating soot buildup on the EGR valve, and thus providing more accurate estimates of the EGR flow. Using an intake oxygen sensor, the EGR flow may be estimated by comparing the oxygen content of intake air when the EGR valve is open, to a base level when the EGR valve is closed. As soot builds up, the EGR flow estimate obtained from the intake oxygen sensor may be compared to the EGR flow estimate obtained from the DP and position sensors (herein also referred to as the DPOV system). FIG. 3 further shows how the difference in EGR flow estimates obtained from the oxygen sensor and DP and position sensors may then be used to ascertain an estimate of soot accumulation on the EGR valve. By considering changes in the effective valve flow area due to soot accumulation, subsequent estimates of EGR flow based on the DP and position sensors may be adjusted based on the determined soot accumulation.

Figure 1:
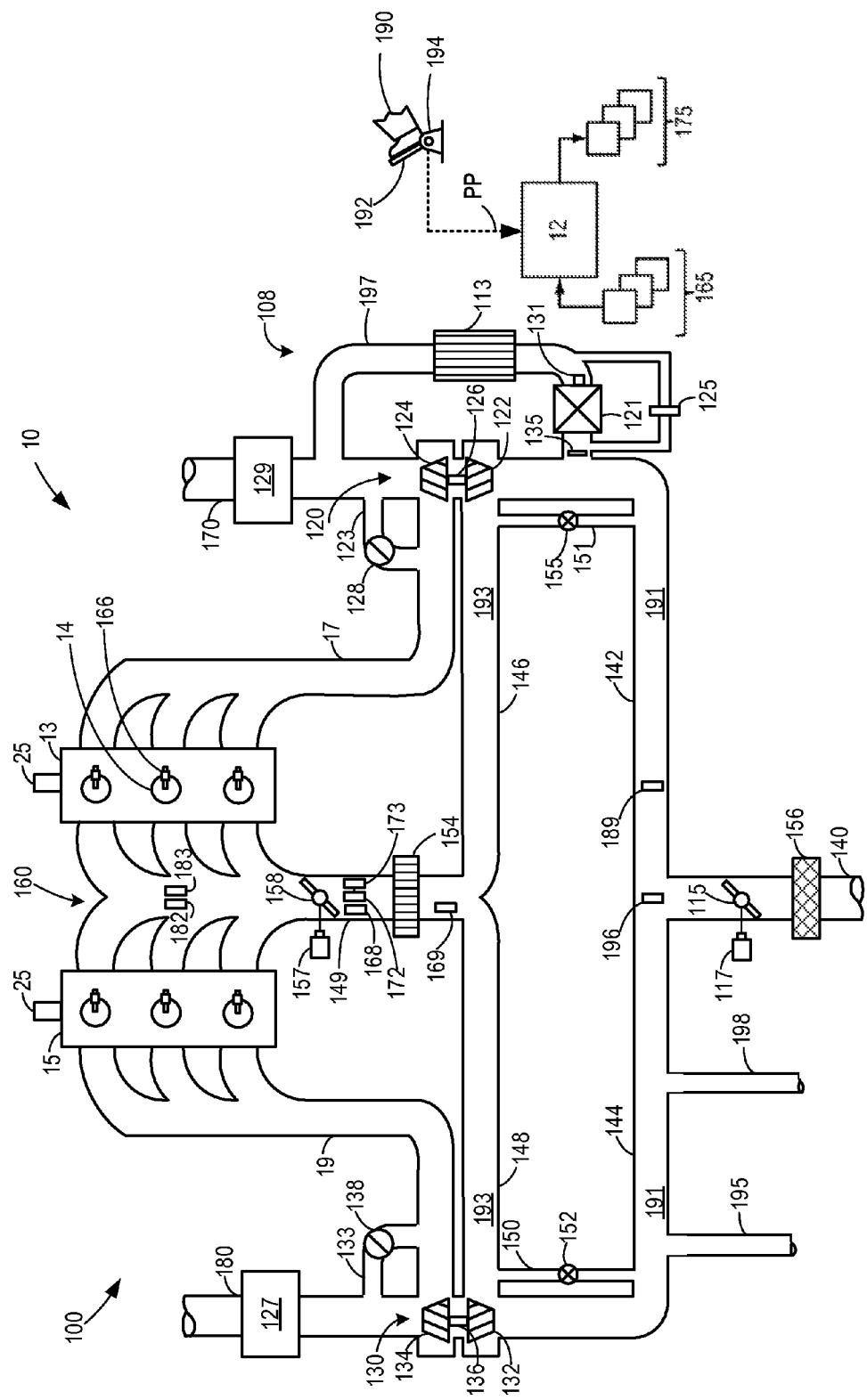
FIG. 1 is a schematic diagram of an example engine system including an intake oxygen sensor and exhaust gas recirculation system.

FIG. 1 shows a schematic depiction of an example turbocharged engine system 100 including a multi-cylinder internal combustion engine 10 and twin turbochargers 120 and 130, which may be identical. As one non-limiting example, engine system 100 can be included as part of a propulsion system for a passenger vehicle. While not depicted herein, other engine configurations such as an engine with a single turbocharger may be used without departing from the scope of this disclosure.

Engine system 100 may be controlled at least partially by a controller 12 and by input from a vehicle operator 190 via an input device 192. In this example, input device 192 includes an accelerator pedal and a pedal position sensor 194 for generating a proportional pedal position signal PP. Controller 12 may be a microcomputer including the following: a microprocessor unit, input/output ports, an electronic storage medium for executable programs and calibration values (e.g., a read only memory chip), random access memory, keep alive memory, and a data bus. The storage medium read-only memory may be programmed with computer readable data representing non-transitory instructions executable by the microprocessor for performing the routines described herein as well as other variants that are anticipated but not specifically listed. Controller 12 may be configured to receive information from a plurality of sensors 165 and to send control signals to a plurality of actuators 175 (various examples of which are described herein). Other actuators, such as a variety of additional valves and throttles, may be coupled to various locations in engine system 100. Controller 12 may receive input data from the various sensors, process the input data, and trigger the actuators in response to the processed input data based on instruction or code programmed therein corresponding to one or more routines. Example control routines are described herein with regard to FIGS. 2-3 and 5-6.

Engine system 100 may receive intake air via intake passage 140. As shown at FIG. 1, intake passage 140 may include an air filter 156 and an air induction system (AIS) throttle 115. The position of AIS throttle 115 may be adjusted by the control system via a throttle actuator 117 communicatively coupled to controller 12.

At least a portion of the intake air may be directed to a compressor 122 of turbocharger 120 via a first branch of the intake passage 140 as indicated at 142 and at least a portion of the intake air may be directed to a compressor 132 of turbocharger 130 via a second branch of the intake passage 140 as indicated at 144. Accordingly, engine system 100 includes a low-pressure AIS system (LP AIS) 191 upstream of compressors 122 and 132, and a high-pressure AIS system (HP AIS) 193 downstream of compressors 122 and 132.

A positive crankcase ventilation (PCV) conduit 198 (e.g., push-side pipe) may couple a crankcase (not shown) to the second branch 144 of the intake passage such that gases in the crankcase may be vented in a controlled manner from the crankcase. Further, evaporative emissions from a fuel vapor canister (not shown) may be vented into the intake passage through a fuel vapor purge conduit 195 coupling the fuel vapor canister to the second branch 144 of the intake passage.

The first portion of the total intake air can be compressed via compressor 122 where it may be supplied to intake manifold 160 via intake air passage 146. Thus, intake passages 142 and 146 form a first branch of the engine's air intake system. Similarly, a second portion of the total intake air can be compressed via compressor 132 where it may be supplied to intake manifold 160 via intake air passage 148. Thus, intake passages 144 and 148 form a second branch of the engine's air intake system. As shown at FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 for estimating a manifold pressure (MAP) and/or an intake manifold temperature sensor 183 for estimating a manifold air temperature (MCT), each communicating with controller 12. In the depicted example, intake passage 149 also includes a charge air cooler (CAC) 154 and a throttle 158. The position of throttle 158 may be adjusted by the control system via a throttle actuator 157 communicatively coupled to controller 12. As shown, throttle 158 may be arranged in intake passage 149 downstream of CAC 154, and may be configured to adjust the flow of an intake gas stream entering engine 10.

As shown at FIG. 1, a compressor bypass valve (CBV) 152 may be arranged in CBV passage 150 and a CBV 155 may be arranged in CBV passage 151. In one example, CBVs 152 and 155 may be electronic pneumatic CBVs (EPCBVs). CBVs 152 and 155 may be controlled to enable release of pressure in the intake system when the engine is boosted. An upstream end of CBV passage 150 may be coupled with intake passage 148 downstream of compressor 132, and a downstream end of CBV passage 150 may be coupled with intake passage 144 upstream of compressor 132. Similarly, an upstream end of a CBV passage 151 may be coupled with intake passage 146 downstream of compressor 122, and a downstream end of CBV passage 151 may be coupled with intake passage 142 upstream of compressor 122. Depending on a position of each CBV, air compressed by the corresponding compressor may be recirculated into the intake passage upstream of the compressor (e.g., intake passage 144 for compressor 132 and intake passage 142 for compressor 122). For example, CBV 152 may open to recirculate compressed air upstream of compressor 132 and/or CBV 155 may open to recirculate compressed air upstream of compressor 122 to release pressure in the intake system during selected conditions to reduce the effects of compressor surge loading. CBVs 155 and 152 may be either actively or passively controlled by the control system.

As shown, a compressor inlet pressure (CIP) sensor 196 is arranged in the intake passage 142 and a HP AIS pressure sensor 169 is arranged in intake passage 149. However, in other anticipated embodiments, sensors 196 and 169 may be arranged at other locations within the LP AIS and HP AIS, respectively. Among other functions, CIP sensor 196 may be used to determine a pressure downstream of an EGR valve 121.

Engine 10 may include a plurality of cylinders 14. In the depicted example, engine 10 includes six cylinders arrange in a V-configuration. Specifically, the six cylinders are arranged on two banks 13 and 15, with each bank including three cylinders. In alternate examples, engine 10 can include two or more cylinders such as 3, 4, 5, 8, 10 or more cylinders. These various cylinders can be equally divided and arranged in alternate configurations, such as V, in-line, boxed, etc. Each cylinder 14 may be configured with a fuel injector 166. In the depicted example, fuel injector 166 is a direct in-cylinder injector. However, in other examples, fuel injector 166 can be configured as a port based fuel injector.

Intake air supplied to each cylinder 14 (herein, also referred to as combustion chamber 14) via common intake passage 149 may be used for fuel combustion and products of combustion may then be exhausted via bank-specific exhaust passages. In the depicted example, a first bank 13 of cylinders of engine 10 can exhaust products of combustion via a common exhaust passage 17 and a second bank 15 of cylinders can exhaust products of combustion via a common exhaust passage 19.

The position of intake and exhaust valves of each cylinder 14 may be regulated via hydraulically actuated lifters coupled to valve pushrods, or via mechanical buckets in which cam lobes are used. In this example, at least the intake valves of each cylinder 14 may be controlled by cam actuation using a cam actuation system. Specifically, the intake valve cam actuation system 25 may include one or more cams and may utilize variable cam timing or lift for intake and/or exhaust valves. In alternative embodiments, the intake valves may be controlled by electric valve actuation. Similarly, the exhaust valves may be controlled by cam actuation systems or electric valve actuation. In still another alternative embodiment, the cams may not be adjustable.

Products of combustion that are exhausted by engine 10 via exhaust passage 17 can be directed through exhaust turbine 124 of turbocharger 120, which in turn can provide mechanical work to compressor 122 via shaft 126 in order to provide compression to the intake air. Alternatively, some or all of the exhaust gases flowing through exhaust passage 17 can bypass turbine 124 via turbine bypass passage 123 as controlled by wastegate 128. The position of wastegate 128 may be controlled by an actuator (not shown) as directed by controller 12. As one non-limiting example, controller 12 can adjust the position of the wastegate 128 via pneumatic actuator controlled by a solenoid valve. For example, the solenoid valve may receive a signal for facilitating the actuation of wastegate 128 via the pneumatic actuator based on the difference in air pressures between intake passage 142 arranged upstream of compressor 122 and intake passage 149 arranged downstream of compressor 122. In other examples, other suitable approaches other than a solenoid valve may be used for actuating wastegate 128.

Similarly, products of combustion that are exhausted by engine 10 via exhaust passage 19 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 19 can bypass turbine 134 via turbine bypass passage 133 as controlled by wastegate 138. The position of wastegate 138 may be controlled by an actuator (not shown) as directed by controller 12. As one non-limiting example, controller 12 can adjust the position of wastegate 138 via a solenoid valve controlling a pneumatic actuator. For example, the solenoid valve may receive a signal for facilitating the actuation of wastegate 138 via the pneumatic actuator based on the difference in air pressures between intake passage 144 arranged upstream of compressor 132 and intake passage 149 arranged downstream of compressor 132. In other examples, other suitable approaches other than a solenoid valve may be used for actuating wastegate 138.

In some examples, exhaust turbines 124 and 134 may be configured as variable geometry turbines, wherein controller 12 may adjust the position of the turbine impeller blades (or vanes) to vary the level of energy that is obtained from the exhaust gas flow and imparted to their respective compressor. Alternatively, exhaust turbines 124 and 134 may be configured as variable nozzle turbines, wherein controller 12 may adjust the position of the turbine nozzle to vary the level of energy that is obtained from the exhaust gas flow and imparted to their respective compressor. For example, the control system can be configured to independently vary the vane or nozzle position of the exhaust gas turbines 124 and 134 via respective actuators.

Products of combustion exhausted by the cylinders via exhaust passage 19 may be directed to the atmosphere via exhaust passage 180 downstream of turbine 134, while combustion products exhausted via exhaust passage 17 may be directed to the atmosphere via exhaust passage 170 downstream of turbine 124. Exhaust passages 170 and 180 may include one or more exhaust after-treatment devices, such as a catalyst, and one or more exhaust gas sensors. For example, as shown at FIG. 1, exhaust passage 170 may include an emission control device 129 arranged downstream of the turbine 124, and exhaust passage 180 may include an emission control device 127 arranged downstream of the turbine 134. Emission control devices 127 and 129 may be selective catalytic reduction (SCR) devices, three way catalysts (TWC), $NO_x$ traps, various other emission control devices, or combinations thereof. Further, in some embodiments, during operation of the engine 10, emission control devices 127 and 129 may be periodically regenerated by operating at least one cylinder of the engine within a particular air/fuel ratio, for example.

Engine system 100 may further include one or more exhaust gas recirculation (EGR) systems for recirculating at least a portion of exhaust gas from the exhaust manifold to the intake manifold. These may include one or more high-pressure EGR systems for proving high pressure EGR (HP EGR) and one or more low-pressure EGR-loops for providing low pressure EGR (LP EGR). In one example, HP EGR may be provided in the absence of boost provided by turbochargers 120, 130, while LP EGR may be provided in the presence of turbocharger boost and/or when exhaust gas temperature is above a threshold. In still other examples, both HP EGR and LP EGR may be provided simultaneously.

In the depicted example, engine system 100 may include a low-pressure (LP) EGR system 108. LP EGR system 108 routes a desired portion of exhaust gas from exhaust passage 170 to intake passage 142. In the depicted embodiment, EGR is routed in an EGR passage 197 from downstream of turbine 124 to intake passage 142 at a mixing point located upstream of compressor 122. The amount of EGR provided to intake passage 142 may be varied by the controller 12 via EGR valve 121 coupled in the LP EGR system 108. In the example embodiment shown at FIG. 1, LP EGR system 108 includes an EGR cooler 113 positioned upstream of EGR valve 121. EGR cooler 113 may reject heat from the recirculated exhaust gas to engine coolant, for example. The LP EGR system may include a differential pressure over valve (differential pressure or delta Pressure or DP) sensor 125. In one example, an EGR flow rate may be estimated based on the DPOV system which includes the DP sensor 125 that detects a pressure difference between an upstream region of the EGR valve 121 and a downstream region of EGR valve 121. EGR flow rate (e.g., LP EGR flow rate) determined by the DPOV system may be further based on an EGR temperature detected by an EGR temperature sensor 135 located downstream of EGR valve 121 and an area of EGR valve opening detected by an EGR valve lift sensor 131. In another example, EGR flow rate may be determined based on outputs from an EGR measurement system that includes an intake oxygen sensor (herein referred to as IAO2 sensor) 168, mass air flow sensor (not shown), manifold absolute pressure (MAP) sensor 182 and manifold temperature sensor 183. In some examples, both the EGR measurement systems (that is, the DPOV system including differential pressure sensor 125 and the EGR measurement system including intake oxygen sensor 168) may be used to determine, monitor and adjust EGR flow rate.

In an alternate embodiment, the engine system may include a second LP EGR system (not shown) that routes a desired portion of exhaust gas from exhaust passage 180 to intake passage 144. In another alternate embodiment, the engine system may include both the LP EGR systems (one routing exhaust gas from exhaust passage 180 to intake passage 144, and another routing exhaust gas from exhaust passage 170 to intake passage 142) described above.

In a further embodiment while not shown in FIG. 1, the engine system 100 may also include a high pressure EGR system which may route a desired portion of exhaust gas from common passage 17, upstream of the turbine 124, to intake manifold 160, downstream of intake throttle 158.

EGR valve 121 may include a body and stem (not shown), where said stem is movable within the body of the EGR valve 121 such that the opening of the EGR valve 121 may be adjusted based on the relative position of the stem and body. The EGR valve 121 may be configured to adjust an amount and/or rate of exhaust gas diverted through the EGR passage to achieve a desired EGR dilution percentage of the intake charge entering the engine, where an intake charge with a higher EGR dilution percentage includes a higher proportion of recirculated exhaust gas to air than an intake charge with a lower EGR dilution percentage. In addition to the position of the EGR valve, it will be appreciated that AIS throttle position of the AIS throttle 115, and other actuators may also affect the EGR dilution percentage of the intake charge. As an example, AIS throttle position may increase the pressure drop over the LP EGR system, allowing more flow of LP EGR into the intake system. As a result, this may increase the EGR dilution percentage, whereas less LP EGR flow into the intake system may decrease the EGR dilution percentage (e.g., percentage EGR). Accordingly, EGR dilution of the intake charge may be controlled via control of one or more of EGR valve position and AIS throttle position among other parameters. Thus, adjusting the EGR valves 121 and/or the AIS throttle 115 may adjust and EGR flow amount (or rate) and subsequently a percentage EGR in the mass air flow (e.g., air charge entering the intake manifold).

The engine 10 may further include one or more oxygen sensors positioned in the common intake passage 149. As such, the one or more oxygen sensors may be referred to as intake oxygen sensors. In the depicted embodiment, an intake oxygen sensor 168 is positioned upstream of throttle 158 and downstream of CAC 154. However, in other embodiments, intake oxygen sensor 168 may be arranged at another location along intake passage 149, such as upstream of the CAC 154. Intake oxygen sensor (IAO2) 168 may be a variable voltage (VVs) oxygen sensor or any suitable sensor for providing an indication of the oxygen concentration and EGR concentration of the intake charge air (e.g., air flowing through the common intake passage 149). In one example, the intake oxygen sensors 168 may be an intake oxygen sensor including a heated element as the measuring element. During operation, a pumping current of the intake oxygen sensor may be indicative of an amount of oxygen in the gas flow.

A pressure sensor 172 may be positioned alongside the oxygen sensor for estimating an intake pressure at which an output of the oxygen sensor is received. Since the output of the oxygen sensor is influenced by the intake pressure, a reference oxygen sensor output may be learned at a reference intake pressure. In one example, the reference intake pressure is a throttle inlet pressure (TIP) where pressure sensor 172 is a TIP sensor. In alternate examples, the reference intake pressure is a manifold pressure (MAP) as sensed by MAP sensor 182.

Engine system 100 may include various sensors 165, in addition to those mentioned above. As shown in FIG. 1, common intake passage 149 may include a throttle inlet temperature sensor 173 for estimating a throttle air temperature (TCT). Further, while not depicted herein, each of intake passages 142 and 144 may include a mass air flow sensor or alternatively the mass air flow sensor can be located in common duct 140.

Humidity sensor 189 may be included in only one of the parallel intake passages. As shown in FIG. 1, the humidity sensor 189 is positioned in the intake passage 142 (e.g., non PCV and non-purge bank of the intake passage), upstream of the CAC 154 and an outlet of the LP EGR passage 197 into the intake passage 142 (e.g., junction between the LP EGR passage 197 and the intake passage 142 where LP EGR enters the intake passage 142). Humidity sensor 189 may be configured to estimate a relative humidity of the intake air. In one embodiment, humidity sensor 189 is a UEGO sensor configured to estimate the relative humidity of the intake air based on the output of the sensor at one or more voltages. Since purge air and PCV air can confound the results of the humidity sensor, the purge port and PCV port are positioned in a distinct intake passage from the humidity sensor.

Intake oxygen sensor 168 may be used for estimating an intake oxygen concentration and inferring an amount of EGR flow through the engine based on a change in the intake oxygen concentration upon opening of the EGR valve 121. Specifically, a change in the output of the sensor upon opening the EGR valve 121 is compared to a reference point where the sensor is operating with no EGR (the zero point). Based on the change (e.g., decrease) in oxygen amount from the time of operating with no EGR, an EGR flow currently provided to the engine can be calculated. For example, upon applying a reference voltage (Vs) to the sensor, a pumping current (Ip) is output by the sensor. The change in oxygen concentration may be proportional to the change in pumping current (delta Ip) output by the sensor in the presence of EGR relative to sensor output in the absence of EGR (the zero point). Based on a deviation of the estimated EGR flow from the expected (or target) EGR flow, further EGR control may be performed.

A zero point estimation of the intake oxygen sensor 168 may be performed during idle conditions where intake pressure fluctuations are minimal and when no PCV or purge air is ingested into the low pressure induction system. In addition, the idle adaptation may be performed periodically, such as at every first idle following an engine start, to compensate for the effect of sensor aging and part-to-part variability on the sensor output.

A zero point estimation of the intake oxygen sensor may alternatively be performed during engine non-fueling conditions, such as during a deceleration fuel shut off (DFSO). By performing the adaptation during DFSO conditions, in addition to reduced noise factors such as those achieved during idle adaptation, sensor reading variations due to EGR valve leakage can be reduced.

Thus, the system of FIG. 1 provides for a system for an engine, comprising: a turbocharger with an intake compressor and an exhaust turbine, a low-pressure exhaust gas recirculation (EGR) passage coupled between an exhaust passage downstream of the exhaust turbine and the intake passage upstream of the intake compressor, the low-pressure EGR passage including an EGR valve and DPOV system for measuring EGR flow, an intake oxygen sensor disposed in an intake of the engine downstream from the low-pressure EGR passage, and a controller with computer-readable instructions for indicating flow-area degradation of the EGR valve based on a difference between a first EGR flow estimate based on an output of the DP sensor and a second EGR flow estimate based on an output of the intake oxygen sensor during engine operation with purge disabled, boost disabled, and mass air flow below a threshold level. The intake oxygen sensor may be further positioned in an intake manifold of the engine and the computer-readable instructions further include instructions for adjusting a third EGR flow estimate, the third EGR flow estimate based on the output of the DP sensor during engine operation when one or more of purge is enabled, boost is enabled, and mass air flow is greater than the threshold level, based on the difference between the first EGR flow estimate and the second EGR flow estimate.

FIG. 2 shows a flow chart of a method 200 for estimating EGR flow in a low-pressure EGR system using an intake oxygen sensor (such as IAO2 168 shown in FIG. 1) and/or a DP sensor (e.g., DP sensor 125 shown in FIG. 1) of a DPOV system based on engine operating conditions. Instructions for carrying out method 200 may be stored in a memory of an engine controller such as controller 12 shown in FIG. 1. Further, method 200 may be executed by the controller. The controller may estimate the EGR mass flow rate using a DP sensor which measures the pressure differential across the EGR valve and a valve position sensor (e.g., such as EGR valve lift sensor 131). However, as explained earlier, as soot accumulates on the EGR valve, the EGR mass flow rate estimate using the DPOV method described above may become increasingly inaccurate. Thus, under some conditions an IAO2 sensor may be used to estimate an EGR mass flow rate to provide an EGR flow rate estimate with increased accuracy. The IAO2 sensor may also be used to determine an estimate of soot accumulation on the EGR valve. Because there may be significant error in the IAO2 sensor's measurements under certain engine operating conditions (e.g. boosted engine operation, intake mass air flow over a threshold) the IAO2 sensor may not be used at all times. Thus, method 200 additionally comprises determining when to use the IAO2 sensor to estimate the EGR mass flow rate. Method 200 further involves comparing an EGR flow estimate obtained from the IAO2 sensor with that from a DPOV system. This may provide an accurate EGR flow estimate from the DPOV system with improved accuracy of the DPOV system input of EGR valve flow area. Method 200 begins at 202 and the controller (e.g. controller 12) estimates and/or measures engine operating conditions based on feedback from a plurality of sensors. Engine operating conditions may include engine temperature, engine speed and load, intake mass air flow, manifold pressure, a position of the EGR valve, a position of a purge valve, etc.

Method 200 proceeds to 204 where the controller determines if EGR is on, based on feedback from a position sensor (e.g. EGR valve lift sensor 131) about the position of the EGR valve. In another example, the controller may determine that EGR is on based on an EGR flow being greater than zero. In this way, EGR flow may be on if EGR is flowing through the low-pressure EGR passage (e.g. EGR passage 197) from the exhaust passage to the intake passage. If the controller determines that the EGR valve is closed and EGR is off, then method 200 continues to 206 where the controller operates an intake air oxygen (IAO2) sensor (e.g. IAO2 sensor 168 shown in FIG. 1) to measure the intake air oxygen level. The IAO2 sensor is configured to apply a base reference voltage ($V_0$) across a pumping electrode pair which pumps oxygen out of or into an internal cavity and generates a pumping current that may be used to infer the oxygen level (i.e., the partial pressure of $O_2$) in the intake air flow. In one embodiment, the IAO2 sensor may be a variable voltage (VVs) oxygen sensor. If at 204 the controller determines that EGR is on, then the controller proceeds to 208 to determine if purge and boost are off.

At 208 and 214, the controller determines if purge and boost are off and if the intake mass airflow is below a threshold, to determine whether to use outputs from the IAO2 sensor or the DP and EGR valve position sensors to estimate the EGR flow. At 208, the controller determines if purge and boost are off. When the engine is not boosted, the IAO2 sensor may provide a more accurate estimate of the EGR flow rate than the DP sensor using the DPOV method. However, if the EGR estimation is performed using outputs from the IAO2 during conditions when fuel canister purge and/or crankcase ventilation is enabled (e.g., PCV flow is enabled), an output of the IAO2 sensor may be corrupted by the additional hydrocarbons flowing to the sensor. Thus, under boosted engine conditions, the DP sensor may provide a more accurate estimate of the EGR flow. The IAO2 sensor output may be corrupted primarily during boosted conditions due to ingested hydrocarbons reacting with ambient oxygen at the sensing element of the intake sensor. This reduces the (local) oxygen concentration read by the sensor. Since the output of the sensor and the change in oxygen concentration is used to infer an EGR dilution of intake aircharge, the reduced oxygen concentration read by the intake oxygen sensor in the presence of purge air and/or PCV may be incorrectly interpreted as additional diluent. Thus, if the controller determines that either purge or boost are on at 208, then method 200 proceeds to 210 and the controller estimates EGR mass flow rate using the DPOV system comprising a delta pressure (DP) sensor (e.g. delta pressure sensor 125) and position sensor (e.g. EGR valve lift sensor 131). The EGR mass flow rate may be proportional to the cross-sectional area of the EGR valve opening and the differential pressure across the EGR valve (as determined from the DP sensor). An estimate of the cross sectional area (e.g., flow area) of the EGR valve opening may be computed from the displacement of the EGR valve (e.g., valve lift) provided by the position sensor, a known cross-sectional flow area of the EGR valve, and a valve lift correction factor. The known cross-sectional flow area of the EGR valve is a standard cross-sectional area of the valve perpendicular to the direction of EGR flow through the valve. The valve lift correction factor may increase the accuracy in the estimate of the flow area by taking into account thermal effects on the expansion of the EGR valve. For example, this thermal compensation method may include using a determined difference between the EGR valve stem and body temperatures to estimate a change in the known (or expected) EGR valve flow area, as explained in greater detail below with reference to FIGS. 5 & 6. The estimate of the cross sectional area of the EGR valve opening (e.g., the EGR valve flow area perpendicular to the direction of flow through the valve) together with the estimated pressure differential across the EGR valve as provided by the DP sensor may be used to estimate the EGR mass flow rate (referred to herein as the DPOV method). Once the EGR mass flow rate is estimated, the controller then adjusts engine operation based on the estimated EGR mass flow rate at 212. As an example, if the estimated EGR mass flow rate is less than a desired rate, the controller may command the EGR valve to open further and allow more exhaust gases to be recirculated to the intake passage (e.g. common intake passage 149). The desired EGR rate may be determined by the controller based on engine operating conditions such as engine load and engine speed.

If at 208 the controller determines that purge and boost are off, then the controller determines if the intake mass air flow is greater than a threshold at 214 based on feedback from a mass air flow sensor in the air intake passage of the engine. Estimating EGR flow based on the output of the IAO2 may include multiplying the output of the sensor by a factor based on the mass air flow in order to convert the output to an EGR flow rate or flow percentage. Thus, in one example, the threshold mass air flow may be based on a mass air flow at which an error in the EGR flow estimate using the IAO2 sensor increases above an acceptable level (or increases above an error in estimating EGR flow using the DPOV method). When calculating the EGR mass estimate using the IAO2 sensor and mass air flow, the EGR mass estimate is influenced by the accuracy of the mass air flow measurement. The relative air flow error on the EGR mass flow estimate may be lower at lower air mass flow rates. The threshold air mass flow rate may be chosen such that the air mass flow error is small compared to the EGR mass flow estimate.

If the intake mass air flow is below the threshold at 214, then the IAO2 sensor may provide a more accurate estimate of the EGR mass flow rate than the DPOV system. As such, the controller may proceed to 216 and estimate the EGR flow rate using the IAO2 sensor. As described in FIG. 1, the intake oxygen sensor may apply a reference voltage which may generate an output in the form of a pumping current (Ip) that may be used to determine the oxygen concentration of the surrounding gas in the common intake passage 149. The controller may then estimate an EGR concentration in the intake air based on a change in the intake oxygen concentration when the EGR valve is open and EGR is on (e.g. EGR valve 121) to a reference point where the EGR valve is closed and EGR is off. In other words, based on the change (e.g., decrease) in oxygen concentration determined when EGR is operating, to a time of operation with no EGR, the controller may estimate the EGR flow. Subsequently, the controller may adjust engine operation based on the estimated EGR mass flow rate at 218. As an example, if the estimated EGR mass flow rate is less than a desired rate, the controller may command the EGR valve to open further and allow more exhaust gases to be recirculated to the intake passage (e.g. common intake passage 149). Additionally, the controller may route more exhaust gas through EGR passage 197. The desired EGR rate may be determined by the controller based on engine operating conditions such as engine load and engine speed.

Alternatively, if the intake mass air flow is above the threshold, estimations of the EGR mass flow rate using the IAO2 sensor may be degraded. As discussed above, in order to estimate the EGR mass flow, the controller may convert EGR concentration as estimated by the IAO2 sensor to an EGR mass flow rate by multiplying the intake air mass air flow rate by the ratio of the concentrations of EGR to intake air. In other words, errors in the EGR flow estimate may be increased in magnitude when multiplying by higher mass air flow values. In this way, estimates of the EGR flow may become increasingly inaccurate at higher air flow levels. If intake mass air flow levels are above the threshold at 214, then estimation of the EGR mass flow rate may be more accurate using the DPOV method than the IAO2 sensor. Thus, if the controller determines at 214 that the intake mass air flow is above the threshold, then the controller may estimate the EGR mass flow rate using the DPOV system at 210. Subsequently at 212, the controller may adjust engine operation based on the estimated EGR mass flow rate. As an example, if the estimated EGR mass flow rate is less than the desired rate, the controller may command the EGR valve to open further and allow more exhaust gases to be recirculated to the intake passage (e.g. common intake passage 149). The desired rate may be determined based on engine operating parameters such as engine load, engine temperature, etc. as described in greater detail in FIG. 1.

As described above, the controller may estimate the EGR mass flow rate using the IAO2 sensor so long as purge and boost are off, and the intake mass air flow is below a threshold. Otherwise, the DPOV system may be used to estimate the EGR mass flow rate. Thus, in one example, under non-boosted engine conditions, the IAO2 may provide a more accurate estimate of the EGR mass flow rate than the DPOV system. Once the EGR mass flow rate has been estimated either by using the IAO2 sensor or the DPOV system, the controller then adjusts engine operation based on the estimated EGR flow rate at 218 and 212 respectively. In one embodiment, the controller may adjust engine operation by increasing or decreasing the amount of EGR by way of opening or closing the EGR valve to match the desired EGR flow rate. If the estimated EGR mass flow rate is less than the desired rate, then the controller may command the EGR valve to open further to allow for more EGR. On the other hand if the estimated EGR is higher than the desired EGR, the controller may command the EGR valve to close an amount thereby reducing the EGR flow.

Returning to method 200, after adjusting engine operation based on the estimated EGR flow rate using the IAO2 sensor at 218, the controller then continues to 220 and determines if it is time for EGR valve area learning. EGR valve area learning may be a method for increasing the accuracy of EGR mass flow rate estimates when it may not be desirable to use the IAO2 sensor, such as under boosted engine operating conditions, and the DPOV system may be used instead. As described in greater detail in FIG. 3, the valve area learning may involve correcting an estimate of the EGR valve flow area by comparing two EGR flow estimates, one obtained from outputs of the IAO2 sensor, and the other obtained from outputs of the DPOV system. Since valve area learning requires a measurement from the IAO2 sensor, it may only occur during non-boosted engine conditions when purge is also disabled, and when intake mass air flow is below a threshold. The controller may determine when valve area learning occurs based on pre-set timing intervals between instances of valve area learning. In one embodiment, the time interval between valve learning instances may be a number of engine cycles. Thus, if a pre-set number of engine cycles have passed since the most recent instance of EGR valve area learning, then the controller may determine that it is time to initiate another valve area learning sequence. As stated above however, valve area learning may only occur so long as the engine is operating under non-boosted conditions and intake mass air flow is below a threshold. In another embodiment, the time interval between valve area learning instances may be a duration of engine use. In a further embodiment, the time interval may be a period of time. Thus, it is important to note that during engine operation, EGR valve area learning may happen many times, each instance producing a correction factor for the estimation of the effective flow area through the EGR valve, where each valve error correction may update an earlier correction determined from a previous valve area learning instance.

If the controller determines that it is time for EGR valve area (e.g., EGR valve flow area) learning, then method 200 continues on to 224 and the controller estimates the EGR mass flow rate using the DPOV system (via the DPOV method described above) and compares it to the EGR flow rate estimate obtained from the IAO2 sensor. The difference in the two estimates may be used to correct expected EGR valve flow area estimates (based on the EGR valve lift sensor and any other lift corrections) and indicate an amount of soot accumulation on the EGR valve, as elaborated below with reference to FIG. 3. Specifically, EGR flow rate estimates obtained using the IAO2 sensor may be less than EGR flow estimates using the DPOV system due to soot accumulation on the EGR valve. The soot may block parts the EGR valve opening and reduce the effective flow area through the valve. The reduced flow area may result in lower EGR mass flow rates at the common intake passage 149 where the oxygen sensor may be positioned. The difference in the two estimates of the EGR mass flow rate may then be used by the controller to determine a corrected EGR valve flow area. For a greater description of how the controller determines the corrected EGR valve flow area, see FIG. 3. If the difference between the two estimates of EGR mass flow is greater than a threshold, then the controller may indicate that soot has accumulated on the EGR valve.

If at 220 the controller determines that a pre-set time interval has not been reached since the most recent instance of valve area learning, then the controller continues engine operation without performing EGR valve offset learning at 222. A correction factor for the flow area through the EGR valve from a previous valve offset learning instance may then be used when using the DPOV method to determine EGR flow for engine control.

Method 200 may further entail a method for an engine, comprising indicating soot accumulation on an exhaust gas recirculation (EGR) valve based on a difference in EGR flow estimated, during a first condition when the engine is not boosted, with an intake oxygen sensor and with a pressure sensor coupled across the EGR valve. The difference in EGR flow is a difference between a first EGR flow estimated based on an output of the intake oxygen sensor during the first condition and a second EGR flow estimated with the pressure sensor across the EGR valve during the first condition, where the pressure sensor is a differential pressure over valve (DP sensor). The method may further comprise estimating the second EGR flow based on an output of the DP sensor and a flow area of the EGR valve, where the flow area of the EGR valve is estimated based on a known cross-section of the EGR valve and an EGR valve position based on an output of an EGR valve position sensor. The first condition further includes when purge is disabled and mass air flow to the engine is less than a threshold level. Thus, method 200 further comprises adjusting engine operation based on EGR flow estimated with the intake oxygen sensor and not the pressure sensor coupled across the EGR valve when the engine is not boosted, purge is disabled, and mass air flow to the engine is below a threshold level. Method 200 further comprises determining a change in EGR valve flow area based on the difference in EGR flow, an expected EGR valve flow area and a first EGR flow estimated with the intake oxygen sensor during the first condition, the expected EGR valve flow area based on an output of an EGR valve position sensor and an EGR valve lift correction, the EGR valve lift correction learned during an EGR valve end stop and thermal compensation learning routine.

An indication of soot accumulation on the EGR valve may be given based on the change in the effective EGR valve flow area. Method 200 may comprise indicating soot accumulation on the EGR valve based on the change in EGR valve flow area increasing above threshold level. In another example, the method may further comprise indicating soot accumulation on the EGR valve based on a rate of change in the change in EGR valve flow area increasing above a threshold rate.

Method 200 may further entail determining a corrected EGR valve flow area based on the determined change in EGR valve flow area and the expected EGR valve flow area and during a second condition when EGR flow is estimated with the DP sensor, estimating EGR flow based on the output of the DP sensor and the corrected EGR valve flow area. The second condition includes one or more of when the engine is boosted, when purge is enabled, and when mass air flow to the engine is greater than a threshold level.

Turning now to FIG. 3, a method 300 for indicating soot accumulation on an EGR valve and determining a corrected EGR valve flow area is shown. Instructions for carrying out method 300 may be stored in a memory of an engine controller such as controller 12 shown in FIG. 1. Further, method 300 may be executed by the controller.

Method 300 may continue from step 224 in method 200. As such, method 300 begins at 302 where the controller estimates EGR mass flow rate with the IAO2 sensor and the EGR valve DPOV system. As described above with reference to FIG. 2, the controller may compute the EGR mass flow (e.g., EGR flow rate or flow percentage) by comparing the intake oxygen concentrations estimated by the oxygen sensor when the EGR valve is open and EGR is on (e.g. EGR valve 121) to a reference point where the EGR valve is closed and EGR is off. The controller may estimate the EGR mass flow rate using the DPOV system based on estimates of the pressure differential across the EGR valve, and the flow area through the valve opening. A DP sensor may provide the pressure differential over the EGR valve. A position sensor coupled to the EGR valve may provide the displacement (e.g., lift) of the EGR valve. The flow area through the EGR valve can then be estimated based on the position of the EGR valve, a known cross-sectional flow area of the valve, and a compensation (e.g., correction) based on the expansion and/or contraction of the EGR valve due to thermal effects (e.g., due to a temperature differential between the EGR valve stem and body), as described in greater detail below with reference to FIGS. 5 & 6.

Once the controller estimates the EGR mass flow rate with the IAO2 sensor and DPOV system at 302, it then adjusts the DPOV EGR estimate for a delay to the location of the IAO2 sensor at 304. Said another way, the delay may be a measurement delay due to the different locations of the IAO2 sensor and EGR valve relative to one another. As described in FIG. 2, the DPOV EGR flow rate estimate may be different than the IAO2 sensor EGR flow rate estimate. This difference may be at least partially caused because the IAO2 sensor and DPOV system are measuring different exhaust gases, or it could be the result of a systematic error in one of the measuring systems. If soot accumulation on the EGR valve decreases the effective flow area of the EGR valve, the DPOV system may systematically overestimate the EGR flow rate. An object of method 300 is to estimate a systematic error in the DPOV measuring system and learn a valve area correction factor that may be used to provide more accurate estimates of the EGR valve flow area and therefore EGR flow estimates. Thus, in order to judge the accuracy of the DPOV system by comparing its EGR mass flow rate estimate to that of the IAO2 sensor, it is important that the IAO2 sensor and the DPOV system measure the same exhaust gases at the same point in time. As can be seen in FIG. 1, exhaust gas must travel a distance from the EGR passage 197 to the common intake passage 149. Thus, it takes time for exhaust gas exiting the EGR valve in the EGR passage to reach the IAO2 sensor located in the common intake passage. Measuring the same exhaust gases at both the EGR valve and the IAO2 sensor may require a time delay adjustment to the DPOV and/or IAO2 EGR estimates. Thus the controller may delay the DPOV flow rate estimate to the IAO2 EGR estimate to account for the time it takes the exhaust gas to travel from the EGR valve to the intake oxygen sensor. In this way, the resulting EGR flow estimates from the DP sensor (of the DPOV system) and the IAO2 sensor may reflect an EGR flow estimate for the same EGR gas.

As one example, the controller may take simultaneous measurements from both the DPOV system and the IAO2 sensor. In one embodiment, the controller may then apply a pre-set time delay correction factor to the IAO2 sensor measurement. The delay correction factor may be based on an estimated time for exhaust gases to travel from the EGR valve to the common intake passage which may be based on airflow rates. In another embodiment, the controller may apply a pre-set time delay correction factor to the DPOV system measurement. The delay correction factor may be based on an estimated time for exhaust gases to travel from the EGR valve to the common intake passage which may be based on airflow rates. For example, in a transient operation, the EGR valve and the delta pressure across the EGR valve (DP) are changing. The EGR mass flow rate calculated at a given instance needs to be compared with the EGR mass flow rate measured by the IAO2 sensor. To be able to compare the same EGR flows, the DPOV measurement of the EGR flow rate is delayed by the time it takes for EGR measurement in question to reach the IAO2 sensor.

In another example, the controller may delay the EGR flow rate estimate using the IAO2 sensor from the DPOV system EGR flow rate estimate. In other words, the measurement of EGR at the IAO2 sensor may occur at a point in time slightly after the DP and position sensor measurements at the EGR valve. The EGR flow rate estimation made by the IAO2 sensor may be slightly delayed to account for the time it takes the exhaust gases to travel from the EGR valve to the intake exhaust sensor. Thus, the controller may determine two estimations of the EGR mass flow rate that are separated in time, but based on measurements of the same exhaust gases. The exact timing between the two measurements may be determined by the controller based on the intake air flow rate, pressure (boost pressure) and temperature. Thus, for faster flow rates, the duration of the delay between the two measurements may be less than for slower flow rates.

In another example, the controller may record several measurements from both the DPOV system and the IAO2 sensor over a period of time of EGR operation under non-boosted engine conditions. The controller may then determine the amount of time it takes exhaust gases to travel to the intake oxygen sensor from the EGR valve based on the estimated airflow rate. Subsequently, the controller may determine which measurements taken from the DPOV system and the IAO2 sensor correspond to the same measured exhaust gases. For a given DPOV measurement, the controller may first determine the time at which that measurement was taken, add the time it takes the exhaust gas to travel to the intake oxygen sensor, and then determine which IAO2 sensor measurement occurred at the later time. The controller may then use those two measurements to obtain two estimates of the EGR mass flow.

Moving forward to 306, the controller may determine an EGR flow rate error from the difference between the IAO2 and DPOV EGR flow rate estimates. An assumption in step 306 may be that the EGR flow rate estimate given by the IAO2 sensor is more accurate than the flow rate given by the DPOV system. Thus, the IAO2 EGR flow rate estimate is treated as the actual estimated EGR flow rate. As explained above, this is a reasonable assumption to make under non-boosted engine conditions when intake air flow rates are below a threshold flow rate. The EGR flow rate estimate obtained from the DPOV system may be have reduced accuracy due to soot accumulation on the EGR valve. In this case, the EGR flow rate estimate obtained from the IAO2 sensor may be less than that obtained from the DPOV system. The EGR flow rate error would be the IAO2 EGR flow rate estimate subtracted from the DPOV EGR flow rate estimate. After estimating the EGR flow rate error, the controller determines the change in the EGR valve flow area based on the EGR flow error at 310. The controller may divide the EGR flow rate error by the IAO2 EGR flow rate estimate, giving a percent error in the DPOV EGR flow rate estimate. Then, multiplying the percent error in the DPOV EGR flow rate estimate by the EGR valve flow area (e.g., an expected or known EGR valve flow area) may give an estimate of the change in the EGR valve flow area due to soot accumulation. The EGR valve flow area may be the same EGR valve flow area estimate used in the DPOV EGR flow rate calculation. In another embodiment, the controller may estimate the EGR valve flow area after making the estimate of the EGR flow rate. Based on the change in EGR valve flow area, the controller may then determine the corrected EGR valve flow area at 312. The corrected EGR valve flow area may be the difference between the estimated flow area obtained from the EGR valve position sensor (e.g., EGR valve lift sensor), and the estimated change in valve flow area. As explained in FIG. 2, soot accumulation on the EGR valve may reduce the flow area through the valve and cause the EGR flow rate as estimated by the IAO2 sensor to be less than that estimated by the DPOV system. Thus, the change in valve flow area may be directly related to the amount of soot accumulation on the EGR valve and may be used to indicate an amount of soot on the EGR valve.

Once the EGR valve area learning has occurred at 312, method 300 then proceeds to 314, and the controller uses the corrected EGR valve flow area for subsequent DPOV EGR flow rate estimates and adjusts EGR based on the corrected EGR flow rate estimate. If the controller uses the corrected EGR valve flow area to estimate the EGR flow rate, and that flow rate is different than the desired flow rate, then the controller may adjust engine operation to match the EGR flow rate to the desired rate. In one example, if the EGR flow rate is less than the desired rate, the controller may command the EGR valve to open further and allow more exhaust gases to be recirculated to the intake passage. The controller may additionally increase the amount of exhaust gases entering EGR passage 197. The desired flow rate may be based on engine operating parameters such as engine load, engine speed, engine temperature, exhaust gas temperature, etc. as measured by a plurality of engine sensors. Thus, when the controller uses outputs from the DPOV system to estimate the EGR flow rate, it may use the corrected EGR valve flow area to do so. As noted in FIG. 2, the controller may continually update the corrected EGR valve flow area due to new estimates of the EGR flow rate based on measurements from the IAO2 sensor. As engine operation continues, so may soot accumulation on the EGR valve. If soot accumulation reaches high enough levels, then the accuracy of the DPOV EGR flow rate may reduce further. The difference between the desired EGR flow and the actual EGR flow may also be larger at greater soot levels due to the inaccurate EGR flow rate estimates. At 316, the controller determines if the EGR valve flow area error is greater than a threshold. In one example, the EGR valve flow area error may be a difference between the actual EGR valve flow area (based on the EGR valve position sensor output) and the corrected EGR valve flow area. In another example the EGR valve flow area error may be based on the EGR flow rate error. If the controller determines that the EGR valve error is greater than the threshold, then it continues to 320 to indicate EGR valve degradation and/or initiate a valve cleaning routine.

In one embodiment, the threshold EGR valve error may be based on the difference between the EGR valve area error and the most recently determined EGR valve area error. As explained in FIG. 2, the controller may continually update the EGR valve area error based on new estimates of the EGR flow rate from the IAO2 sensor. Thus, if the EGR valve area error is greater than the most recently determined EGR valve area error by more than a threshold, the controller may indicate EGR valve degradation and/or initiate valve cleaning routine. In another embodiment, the threshold EGR valve error may be based on the difference between the EGR valve area error and a raw estimate of the EGR valve flow area based only on the position of the EGR valve and a known area of the valve without using the EGR valve flow error correction. The raw estimate of the EGR valve flow area could be a first estimate of the valve flow area that was made before any soot accumulation and valve area learning. The controller may archive the raw estimate for the duration of engine operation. The raw estimate may also be generated each time the DPOV system is used to estimate the valve flow area, and then the EGR valve flow error correction may be applied after. In other words, the flow area may first be determined by the position of the EGR valve and a known area of the valve. Then, the EGR valve error may be applied to correct the estimate of the flow area. The controller may compare the EGR valve area estimate before valve error correction to the EGR valve area estimate after valve error correction. If the difference between the two valve area estimates is greater than a threshold, then the controller may continue to 320. The threshold may also be thought of as a threshold amount of soot accumulation on the EGR valve, since the change in EGR valve area may be directly related to the soot accumulation on the EGR valve. In another embodiment, the threshold may be based on the rate of change of the change in the EGR valve area estimate. If the rate of change in valve flow area as estimated by the EGR error increases above a threshold, then the controller may proceed to 320.

At 320, the controller may indicate EGR valve degradation. The indication may be given to the user via a user feedback display such as a light switch on the dashboard. The controller may additionally or alternatively initiate a valve cleaning routine which may be used to reduce the amount of soot on the EGR valve. In still another example, indicating EGR valve degradation may include setting a diagnostic code.

If at 316, the controller determines that the EGR valve area error is not greater than a threshold, then the controller continues to 318 and continues EGR valve operation without indicating EGR valve degradation and/or initiating a valve cleaning routine.

Method 300 involves estimating a change in the EGR valve flow area due to soot accumulation. In one example, the determined change in EGR flow area may be used to correct the EGR flow rate estimated using the DPOV method. The method may further include indicating EGR valve degradation and/or initiating an EGR valve cleaning routine if soot accumulation has reached a threshold level, as determined based on an EGR valve area error, a change in the EGR valve flow area, and/or a rate of change in the EGR valve flow area and/or the EGR flow rate error.

FIG. 3 includes a method for an engine, comprising: during selected conditions, comparing a first exhaust gas recirculation (EGR) flow estimated based on an output of an intake oxygen sensor with a second EGR flow estimated based on a pressure difference across an EGR valve, and indicating soot build-up on the EGR valve based on the comparison. Comparing the first EGR flow with the second EGR flow includes learning a flow area error of the EGR valve based on a difference between the first EGR flow and second EGR flow. Indicating soot build-up on the EGR valve includes indicating degradation of the EGR valve due to soot based on the learned flow area error increasing above a threshold. The method may further comprise during subsequent engine operation when EGR flow is estimated based on the pressure difference across the EGR valve, adjusting the EGR flow estimate based on the learned flow area error. The pressure difference across the EGR valve may be measured via a differential pressure over valve (DP) sensor coupled across the EGR valve. Indicating soot build-up on the EGR valve includes one or more of setting a diagnostic code, initiating an EGR valve cleaning routine, and alerting a vehicle operator that the EGR valve is degraded and needs servicing. The selected conditions may include when the engine is not boosted, purge is disabled, and when mass air flow is less than a threshold level. Indicating soot accumulation includes one or more of initiating a cleaning routine, alerting a vehicle operator that the EGR valve is degraded, and setting a diagnostic code.

Determining the adjusted valve flow area is further based on a second change in flow area due to EGR valve soot accumulation. The method may comprise determining the second change in flow area based on a difference in EGR flow estimated, during a first condition when the engine is not boosted, with an intake oxygen sensor and with a pressure sensor coupled across the EGR valve. Determining the second change in flow area is further based on an expected EGR valve flow area and a first EGR flow estimated with the intake oxygen sensor during the first condition, the expected EGR valve flow area based on an output of an EGR valve position sensor and an EGR valve lift correction, the EGR valve lift correction learned during an EGR valve end stop and thermal compensation learning routine. The method may further comprise indicating soot accumulation on the EGR valve based on the based on the second change in flow area increasing above threshold level.

Moving on to FIG. 4, a graph illustrating how EGR flow may be estimated under varying engine conditions is shown. Specifically, a graph 400 shows changes in EGR flow as measured by an EGR valve DPOV system at plot 402 and as measured by an IAO2 sensor at plot 404. Graph 400 also shows an EGR valve flow rate error at plot 406, an estimated amount of soot buildup on an EGR valve at 408, an intake mass air flow rate at plot 410, a boost condition of the engine at plot 412, and a purge condition at plot 414. The EGR valve flow rate error is essentially the difference between the EGR flow rate estimates from the DPOV system and IAO2 sensor as described in greater detail in the method in FIG. 3. Thus, the EGR valve flow rate error is the error in the DPOV EGR flow rate estimate based on the difference between the EGR flow rate estimates from the IAO2 sensor and the DPOV system. The soot buildup may be inferred from the EGR flow rate error as described by the method in FIG. 3. More specifically, the EGR flow rate error may be used to estimate an EGR flow area error since the EGR flow rate error may be caused by a change in the EGR valve flow area due to soot accumulation. The EGR flow area error may then be used to infer an amount of soot accumulation. Intake mass air flow may be measured by a mass air flow sensor. The operational status of boost and purge may be regulated by a controller (e.g. controller 12). Thus, the controller may determine purge levels based on the position of a purge valve in the purge passage (e.g., fuel vapor purge conduit 195). The controller may determine boost levels via the operational status of the turbines, compressors, or by commands sent to the turbocharger.

As described above with reference to FIGS. 2 & 3, both a DPOV system and an IAO2 sensor may be used to estimate the EGR mass flow rate in a turbocharged engine. Both the DPOV system and the IAO2 sensor may only be used under certain operating conditions to estimate EGR mass flow rate estimates, due to sensor corruption under conditions like boosting, purge, etc., as elaborated in FIG. 2. Thus, EGR flow rate estimates from the DPOV system and the IAO2 sensor may have varying levels of accuracy depending on the engine operating conditions. For example, when the intake mass air flow is above a threshold, the DPOV system may provide more accurate EGR flow rate estimates than the IAO2 sensor. However, under non-boosted engine conditions when purge is disabled, and when the intake mass air flow is below a threshold, the IAO2 sensor measurements may produce more accurate estimates of the EGR mass flow rate than the DPOV system. The controller may determine whether the EGR flow rate estimate from the DPOV system or the IAO2 sensor is more accurate based on engine operating conditions. In another embodiment, the controller may use a combination of the EGR flow rate estimates to estimate the EGR flow rate. Thus, if the controller determines that purge and boost are disabled, and the intake mass airflow is below a threshold, then the controller may use the IAO2 sensor EGR estimates to correct and increase the accuracy of the DPOV system EGR flow rate estimates. Thus, by capitalizing on IAO2 measurements when the engine is operating under select operating conditions (e.g. non-boosted, purge disabled, low intake mass airflow conditions), the estimates of the EGR mass flow rate under all vehicle operating conditions may be improved. This is especially helpful because as soot accumulates on the EGR valve, the DPOV system EGR flow rate estimates may become increasingly inaccurate due to the decreased in valve flow area caused by the soot. Thus, by using the IAO2 sensor as a reference point, the DPOV system EGR rate estimates may be corrected to account for the decreased EGR valve flow area due to soot accumulation. If soot accumulation reaches a critical threshold, then a valve cleaning routine may be initiated, or an indication of soot buildup may be reported to the vehicle operator.

Starting before time $t_1$, boost is on (plot 412) (e.g., the engine is boosted), while purge is off (plot 414), and the intake mass air flow is below a threshold $T_1$ (plot 410). Since boost is on, EGR flow estimates via the IAO2 sensor (plot 404) are not being taken, as can be seen from the absence of plot 404 before time $t_1$. The EGR valve flow rate error may be at a first level $E_1$ (plot 406). The first level $E_1$ may be an EGR valve flow rate error estimated from a previous valve area learning event. The soot buildup may be at a first level $S_1$ corresponding to the EGR valve flow area error level $E_1$. At time $t_1$, boost is turned off, but the intake mass air flow spikes above the threshold $T_1$. Thus, the controller continues to use the DPOV system to estimate the EGR mass flow rate without considering outputs from the IAO2 sensor. Because measurements from the IAO2 sensor are not being taken, no new valve area learning may occur, and thus there may be no new estimates of the EGR valve flow rate error or soot buildup. Thus, the EGR valve flow area error and the soot buildup remain the same before and after $t_1$ at levels $E_1$ and $S_1$, respectively.

At time $t_2$ purge is turned on, and the intake mass air flow drops back below the threshold $T_1$. The IAO2 sensor measurements continue to be unused by the controller, and thus EGR valve flow rate error and soot buildup estimates remain unchanged. At time t3, the intake mass air flow increases above the threshold $T_1$, and boost is turned on. Purge also remains on. The controller continues to neglect IAO2 sensor measurements, and the soot buildup estimate stays at first level $S_1$ and EGR valve flow area error remains at $E_1$. It is important to note that the three engine operating parameters (intake mass air flow, boost, and purge) may be on or above a threshold level in any combination. So long as either boost or purge is on, or the intake mass air flow is above $T_1$, however, the IAO2 sensor measurements will remain unused by the controller, and the estimates for soot buildup and EGR valve flow rate error will remain unchanged.

At time $t_4$, the intake mass air flow drops below threshold $T_1$, and both purge and boost are turned off. Thus, at time $t_4$ the controller may estimate EGR flow using the IAO2 sensor output (at plot 404). At this point, EGR mass flow rate estimates are obtained from both the IAO2 sensor and the DPOV system. The controller may compare the two EGR flow estimates and estimate an EGR valve flow rate error as described in the method of FIG. 3. Because the IAO2 sensor may not have been used to estimate EGR flow before time $t_4$, an amount of soot may have accumulated on the EGR valve, as seen in the spike on plot 408 from first level $S_1$ to a higher second level S2. The soot buildup may cause inaccuracies in the DPOV system EGR flow rate estimates, specifically in the estimation of the EGR valve flow area. Accordingly, in plot 406 at time $t_4$, the EGR valve flow rate error increases from a first error $E_1$ to a higher second error, $E_2$.

From time $t_4$ to time $t_5$, boost and purge remain off, and the intake mass air flow stays below $T_1$. EGR mass flow rate estimates based on the IAO2 sensor output continue to be taken during this time, but they may diverge from the DPOV EGR mass flow rate estimates. This may be due to soot accumulation on the EGR valve increasing from time $t_4$ to time $t_5$. Thus, as more and more soot accumulates on the EGR valve, the difference between the estimations of the EGR mass flow rate between the DPOV system and the IAO2 sensor may increase. As seen in plots 406 and 408 from time $t_4$ to time $t_5$, soot accumulation steadily increases, and so does the EGR valve flow rate error. Then at time $t_5$, the controller corrects the EGR valve area estimate as described in the method of FIG. 3. Due to the correction, the EGR mass flow rate as estimated by the DPOV system becomes more accurate, and more similar to that of the estimate obtained from the IAO2 sensor. Thus at time $t_5$ the EGR valve flow rate error decreases from a higher level $E_4$ to a lower level similar to that of $E_1$. Meanwhile, the soot buildup continues to increase. At time $t_5$, although soot buildup continues to increase, the controller uses the IAO2 sensor measurements as a reference point to correct estimates of the EGR valve flow rate using the DPOV system. Specifically, the controller may use the difference between the IAO2 sensor and the DPOV system EGR flow rate estimates to infer an error in the EGR valve flow area estimates. Since the EGR valve flow area is used to estimate the DPOV system EGR flow rate, errors in the EGR valve flow area due to soot accumulation may cause errors in the DPOV system EGR flow rate estimates. Thus, disparities between IAO2 sensor and DPOV system EGR flow rate estimates may be attributed to errors in the EGR valve flow area estimates as a result of soot accumulation on the EGR valve. Accordingly, the EGR valve flow rate error may be used to infer an EGR valve flow area error. By accounting for changes in the EGR valve flow area due to soot accumulation on the EGR valve, the accuracy of the DPOV EGR flow rate estimates are increased.

Moving forward in time to time $t_6$, the intake mass air flow increases above the threshold $T_1$. As seen at plot 404, the controller ceases to use outputs from the IAO2 sensor for EGR flow rate estimates at time $t_6$. The DPOV system continues to take measurements (plot 402), and the controller uses the corrected EGR valve flow area estimated from the EGR flow rate error at time $t_5$ to estimate the EGR mass flow rate. Thus, the EGR valve flow rate error remains constant after time $t_6$ since no new IAO2 sensor measurements are used to compare to the DPOV system estimates. Similarly, after time $t_6$, soot may continue to accumulate on the EGR valve, but without accurate IAO2 measurements, the controller may be unable to measure and/or estimate soot levels. As such, as seen at plot 408, soot levels as estimated by the controller, remain constant after time $t_6$.

At time $t_7$, the intake mass air flow decreases below the threshold $T_1$, while boost and purge remain off. Thus, the controller may estimate EGR flow based on outputs of the IAO2 sensor at time $t_7$. The EGR mass flow rate estimates from the IAO2 sensor may be less than the estimates from the DPOV system. Accordingly, the EGR valve flow rate error increases from a level similar to that of $E_1$ to a higher level $E_3$ due the disparity in the two estimates of the EGR mass flow rate. Soot accumulation as estimated by the controller increases from a lower level $S_3$ to a higher level $S_4$ due to the difference between the IAO2 sensor and DPOV sensor EGR flow estimates. From time $t_7$ to time $t_8$, the EGR mass flow rate estimates from the DPOV system and IAO2 sensor diverge due to increased soot accumulation on the EGR valve, and thus more error in the EGR valve area estimate from the DPOV system. The EGR valve flow rate error steadily increases, until at time $t_8$, the controller corrects the EGR valve flow area estimate as described in the method of FIG. 3, just as it did at time $t_5$. With the corrected EGR valve area, the DPOV system EGR mass flow rate estimate more closely matches the IAO2 sensor estimate. The EGR valve flow rate error decreases to a lower level similar to that of $E_1$. Meanwhile soot accumulation continues to increase. Thus, at time $t_5$ and time $t_8$ the controller initiates valve area learning, and corrects the EGR valve area estimate from the DPOV system, so that the EGR mass flow rate estimate from the DPOV system more closely matches the estimate from the IAO2 sensor.

Moving on to time $t_9$, soot accumulation reaches a threshold $T_2$. As described in the method in FIG. 3, the controller may indicate to a vehicle operator that the EGR valve is degraded at time $t_9$, or it may initiate a valve cleaning routine in response to the soot accumulation reaching the threshold T2. If the controller indicates EGR valve degradation to a vehicle operator, soot accumulation may continue to increase after time $t_9$. However, if the controller initiates a valve cleaning routine, then soot may be removed from the EGR valve, and soot levels may drop to a lower level $S_5$, similar to that of $S_1$. After time $t_9$, the intake mass air flow remains below the threshold $T_1$, and boost and purge remain off. Thus, IAO2 sensor measurements continue to be used to estimate the EGR mass flow rate, and soot accumulates on the EGR valve. Accordingly, the EGR valve flow rate error increases, and the EGR mass flow rate estimates from the DPOV system and IAO2 sensor may differ from one another.

Graph 400 shows how the controller may estimate EGR mass flow rates depending on engine operating conditions. In one embodiment, the controller may estimate EGR mass flow using only the DPOV system when one or more of the intake mass air flow is above a threshold, boost is on, or purge is enabled. Under conditions when the intake mass air flow is below a threshold, boost is off and purge is disabled, the controller may use the IAO2 sensor to estimate the EGR mass flow rate due to the increased accuracy of the IAO2 sensor under these conditions. In other embodiments, the controller may estimate EGR flow using both the IAO2 sensor and the EGR valve DPOV system; however, the controller may then decide which estimate to use based on a relative accuracy of each measurement, the relative accuracy based on engine operating conditions such as boost level, purge level, and/or mass air flow. The controller may compare the DPOV system EGR mass flow estimates to those of the IAO2 sensor to judge an amount of error in the DPOV system EGR flow estimates. The controller may then correct the DPOV system EGR flow rate estimates based on the IAO2 sensor estimates. The error in the DPOV system EGR mass flow estimates may increase during engine use, as soot may accumulate on the EGR valve. Soot accumulation may affect the estimates of the EGR valve flow area and thus the EGR flow estimates as well. By using the IAO2 sensor measurements as a comparative reference point, the DPOV system EGR mass flow rate estimates may be corrected by taking into account the decreased EGR valve flow area as a result of soot accumulation. Further, when soot accumulation reaches a threshold soot level, the controller may signal that the EGR valve has been degraded and/or or it may initiate a valve cleaning routine to clear soot off the EGR valve.

Figure 5:
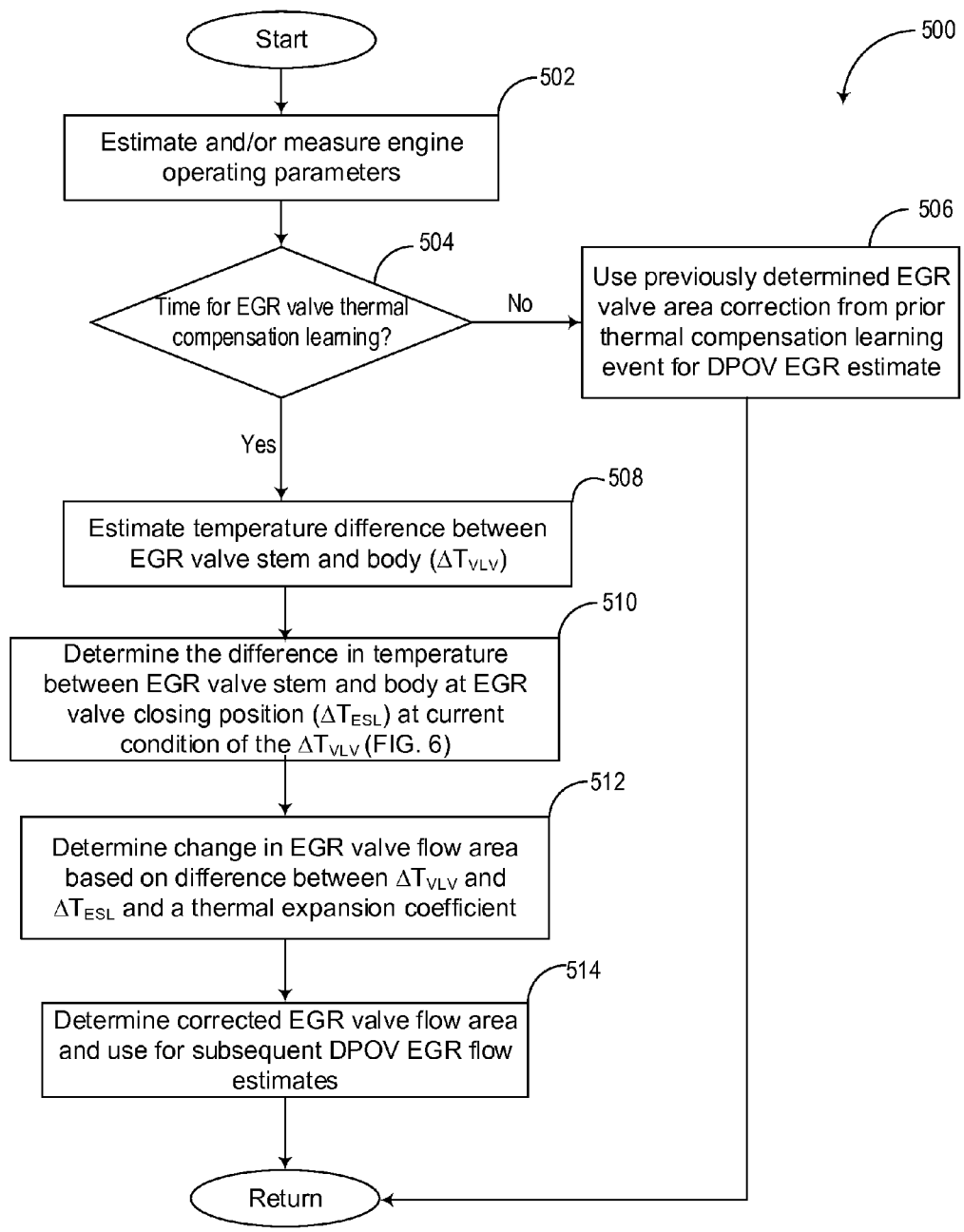
FIG. 5 is a flow chart of a method for learning changes in EGR valve flow area due to changes in a temperature difference between an EGR valve stem and body.

Moving on to FIG. 5, a method 500 for learning changes in EGR valve flow area due to changes in a temperature difference between an EGR valve stem and body is provided. As a temperature difference between the body and the stem of the EGR valve increases, the cross-sectional flow area of the EGR valve may change due to thermal expansion or contraction, thereby increasing the error in the EGR valve flow area and thus the resulting EGR flow estimate using the DPOV method. More accurate estimates of the EGR valve flow area may increase the accuracy of estimates of the EGR flow rate using the DPOV system. Thus, method 500 may provide a means for more accurately estimating the EGR flow rate using the DPOV system. As described earlier in FIGS. 2 and 3, the DPOV system may estimate an EGR flow rate based on a pressure difference across the EGR valve (e.g. EGR valve 121), and a flow area through the EGR valve. The EGR valve flow area may be estimated based on the position of the EGR valve (as determined by a lift sensor) and a known cross-sectional flow area of the valve. Method 500 provides a correction factor for estimating the EGR valve flow area that is based on thermal expansion of the EGR valve. Instructions for carrying out method 500 may be stored in a memory of an engine controller such as controller 12 shown in FIG. 1. Further, method 500 may be executed by the controller.

Method 500 begins at 502 where the controller estimates and/or measures engine operating parameters. Engine operating parameters may be estimated based on feedback from a plurality of sensors and may include: engine temperature, engine speed and load, intake mass air flow, manifold pressure, etc.

The controller then continues to 504 and determines if it is time for EGR valve thermal compensation learning. Valve thermal compensation learning may involve estimating a change in the EGR valve flow area based on a change in the difference between the temperature of a stem and body of the EGR valve, as described further below. The controller may determine the timing of the thermal compensation learning based on how much time has elapsed since the most recent thermal compensation learning event. Thus, the controller may initiate valve thermal compensation learning after a pre-set amount of time has elapsed since the most recent thermal compensation learning event. The pre-set amount of time may be a number of engine cycles, duration of engine use, or a period of time. Thus, if the pre-set amount of time has not elapsed since the most recent thermal compensation learning event, then the controller may determine that thermal compensation is not needed and may proceed to 506. At 506, the controller may use a previously determined EGR valve area correction from a prior thermal compensation learning event for DPOV EGR estimates. This previously determined EGR valve area correction may then be used in the methods of FIGS. 2-3 to more accurately estimate EGR flow using the DPOV method.

If the pre-set amount of time has elapsed since the most recent thermal compensation learning event, then the controller may determine that it is time for thermal compensation learning and proceed to 508. At 508, the controller estimates the difference in temperature between the stem and body of the EGR valve based on the EGR temperature. Specifically, the temperature difference between the stem and body of the EGR valve may be stored in the memory of the controller as a function of EGR temperature. The relationship between the difference in EGR valve stem and body temperature and the EGR temperature may be pre-set based on factory testing. The EGR temperature may be estimated by a temperature sensor (e.g., EGR temperature sensor 135) either upstream or downstream of the EGR valve. The temperature registered by the temperature sensor may be adjusted depending on the position of the temperature sensor relative to the EGR valve. Exhaust gas may cool as it travels through an exhaust passage (e.g., EGR passage 197), and thus the temperature registered by a sensor downstream of the EGR valve may be lower than the actual temperature of the exhaust gas as it passes through the EGR valve. Conversely, an upstream temperature sensor may register an exhaust gas temperature warmer than that at the EGR valve. The amount of change in the temperature of the exhaust gas from the position of the EGR valve to the temperature sensor may be pre-determined by factory testing and based on EGR flow. Thus, the temperature of the exhaust gas registered by the temperature sensor may be modified to represent the temperature of the exhaust gas at the EGR valve. With estimates of the EGR temperature, the controller may estimate the difference in temperature between the EGR valve stem and body using a known relationship between the EGR temperature, and EGR valve stem and body temperature difference. The resulting difference in temperature may then be modified based on EGR flow. In this way, the temperature different between the EGR valve stem and body may be based on EGR temperature and EGR flow.

Subsequently, at 510, the controller may determine the difference in temperature between the EGR valve stem and body at an EGR valve closing position ($\Delta T_{ESL}$) corresponding to substantially the same EGR temperature as used to determine the $\Delta T_{vlv}$ at 508. More specifically, at 508 the difference between the stem and body temperature of the EGR valve is determined at a current EGR temperature. Whenever the EGR valve closes (e.g., closes completely such that no EGR is flowing though the EGR passage), the controller may store the temperature difference between the stem and body of the EGR valve as a function of the EGR temperature, as described further below with reference to FIG. 6. Therefore, the controller may retrieve (e.g., look up)

a body and stem temperature difference corresponding to the same EGR temperature at which the $\Delta T_{vlv}$ was estimated at in 508.

Method 500 may then proceed to 512 and the controller may determine the change in EGR valve flow area based on the difference between $\Delta T_{vlv}$ and $\Delta T_{ESL}$ and a thermal expansion coefficient. Specifically, the controller may multiply the difference between $\Delta T_{vlv}$ and $\Delta T_{ESL}$ by a thermal expansion coefficient to give an estimate of the change in the EGR valve flow area. In one example, the thermal expansion coefficient may be predetermined based on the type of material comprising the EGR valve.

After determining the change in the EGR valve flow area, the controller may continue to 514 and determine a corrected EGR valve flow area for use in subsequent DPOV EGR flow estimates. Thus, the corrected EGR valve flow area may be determined based on the change in the EGR valve flow area. Specifically, as described earlier in FIG. 2, the EGR valve flow area may be determined from the position of the EGR valve (as determined by a lift sensor of the EGR valve) and a known cross-sectional flow area of the EGR valve. However, due to the thermal expansion of the EGR valve, the EGR valve flow area may be different than the flow area determined by using the position and known area of the EGR valve. Thus, using the change in valve flow area due to thermal expansion of the EGR valve, the accuracy of the estimation of the EGR valve flow area may be increased and may more closely match the actual flow area through the EGR valve and thus the effective EGR flow rate through the valve. When determining the EGR valve flow area therefore, the controller make consider both the effects of thermal expansion of the valve and the amount of soot accumulation on the valve. Thus, the controller may estimate a first EGR valve area correction factor based on the thermal expansion of the EGR valve. The controller may also determine a second EGR valve area correction factor based on soot deposition on the EGR valve. By incorporating the two EGR valve area correction factors, the controller may determine a total EGR valve flow area correction factor. Thus, the accuracy of the EGR valve area estimates may be increased and may subsequently be used to provide more accurate DPOV EGR flow estimates as described earlier in FIG. 2. Specifically, the EGR valve area estimate and the pressure differential across the EGR valve as measured by the DP sensor may be used to infer an EGR rate.

In this way, a method for an engine may comprise adjusting an exhaust gas recirculation (EGR) valve based on an estimate of EGR flow, the EGR flow estimated based on a pressure difference across the EGR valve and an adjusted valve flow area, the adjusted valve flow area based on a first temperature difference between a stem and body of the EGR valve. The pressure difference across the EGR valve may be estimated with a pressure sensor across the EGR valve, wherein the pressure sensor is a differential pressure over valve (DP) sensor, and wherein the adjusted valve flow area is further based on a known cross-section of the EGR valve and an EGR valve position, the EGR valve positioned measured with an EGR valve position sensor (e.g., such as a lift sensor). The adjusted valve flow area is adjusted from a known cross-sectional flow area of the EGR valve and an output of an EGR valve position sensor. The method may further comprise determining the adjusted valve flow area based on a first change in flow area based on the first temperature difference between the stem and body of the EGR valve and a thermal expansion coefficient of the EGR valve. The method may further include: at each closing event of the EGR valve, determining a second temperature difference between the stem and body of the EGR valve at an EGR valve closing position and storing the determined second temperature difference at the EGR valve closing position in a memory of a controller. The first change in flow area is further based on a difference between the first temperature difference between the stem and body of the EGR valve and the second temperature difference between the stem and body of the EGR valve at the EGR valve closing position. The method may further comprise estimating the first temperature difference based on a temperature and flow rate of EGR gas flowing through the EGR valve.

In another example, a method for an engine may further comprise determining an EGR valve lift correction based on a change in a temperature difference of a stem and body of the EGR valve between when the valve is open and closed, where the temperature difference of the stem and body of the EGR valve is based on an EGR temperature measured proximate to the EGR valve and EGR flow.

In another example, a method for an engine comprises: estimating an exhaust gas recirculation (EGR) flow based on a pressure difference across an EGR valve and a total valve flow area, learning a first valve flow area correction factor based on a first temperature difference between a stem and body of the EGR valve, and adjusting the total valve flow area based on the first learned valve flow area correction factor. Learning the first valve flow area correction factor includes storing the learned first valve flow area correction factor in a memory of a controller and repeating the learning the first valve flow area correction factor after a duration, the duration including one or more of a duration of engine operation and a number of engine cycles. Learning the first valve flow area correction factor includes estimating the first temperature difference between the stem and body of the EGR valve based on EGR flow and a temperature of exhaust flowing through the EGR valve. Learning the first valve flow area correction factor includes estimating the first temperature difference between the stem and body of the EGR valve based on EGR flow and a temperature of exhaust gas flowing through the EGR valve. Learning the first valve flow area correction factor includes multiplying the difference between the first temperature difference and the second temperature difference by a thermal expansion coefficient of the EGR valve, where the thermal expansion coefficient is a coefficient of thermal expansion of valve lift per degree of temperature difference between the stem and body of the EGR valve. The method for an engine further comprising learning a second valve flow area correction factor based on a difference between a first EGR flow estimated based on an output of an intake oxygen sensor and a second EGR flow estimated based on the pressure difference across the EGR valve during engine operation with purge disabled, boost disabled, and mass air flow below a threshold level and further comprising adjusting the total valve flow area based on the first learned valve flow area correction factor and the second valve flow area correction factor. Estimating the EGR flow includes estimating the EGR flow based on the pressure difference across the EGR valve and the total valve flow area during a first condition when one or more of engine purge and boost are on, and when intake mass airflow is above a threshold. The method further comprises estimating the EGR flow based on an output of an intake oxygen sensor and not the pressure difference across the EGR valve during a second condition when engine purge and boost are off and the intake mass airflow is below the threshold.

In another example, a system for an engine comprises: a turbocharger with an intake compressor and an exhaust turbine, a low-pressure exhaust gas recirculation (EGR)

passage coupled between an exhaust passage downstream of the exhaust turbine and the intake passage upstream of the intake compressor, the low-pressure EGR passage including an EGR valve and DP sensor for estimating EGR flow, an intake oxygen sensor disposed in an intake of the engine downstream from the low-pressure EGR passage, and a controller with computer-readable instructions for adjusting the EGR valve based on the EGR flow estimated based on an output of the DP sensor and an adjusted valve flow area, the adjusted valve flow area based on a first temperature difference between a stem and body of the EGR valve and a second temperature difference between the stem and body of the EGR valve at a closing position of the EGR valve. The intake oxygen sensor is further positioned in an intake manifold of the engine and wherein the adjusted valve flow area is further based on a difference between a first EGR flow estimate based on an output of the DP sensor and a second EGR flow estimate based on an output of the intake oxygen sensor during engine operation when boost and purge are disabled and mass air flow is below a threshold level. The engine system may further comprise a temperature sensor positioned proximate to the EGR valve within the low-pressure EGR passage and wherein the first and second temperature differences are based on an output of the temperature sensor and EGR flow.

Figure 6:
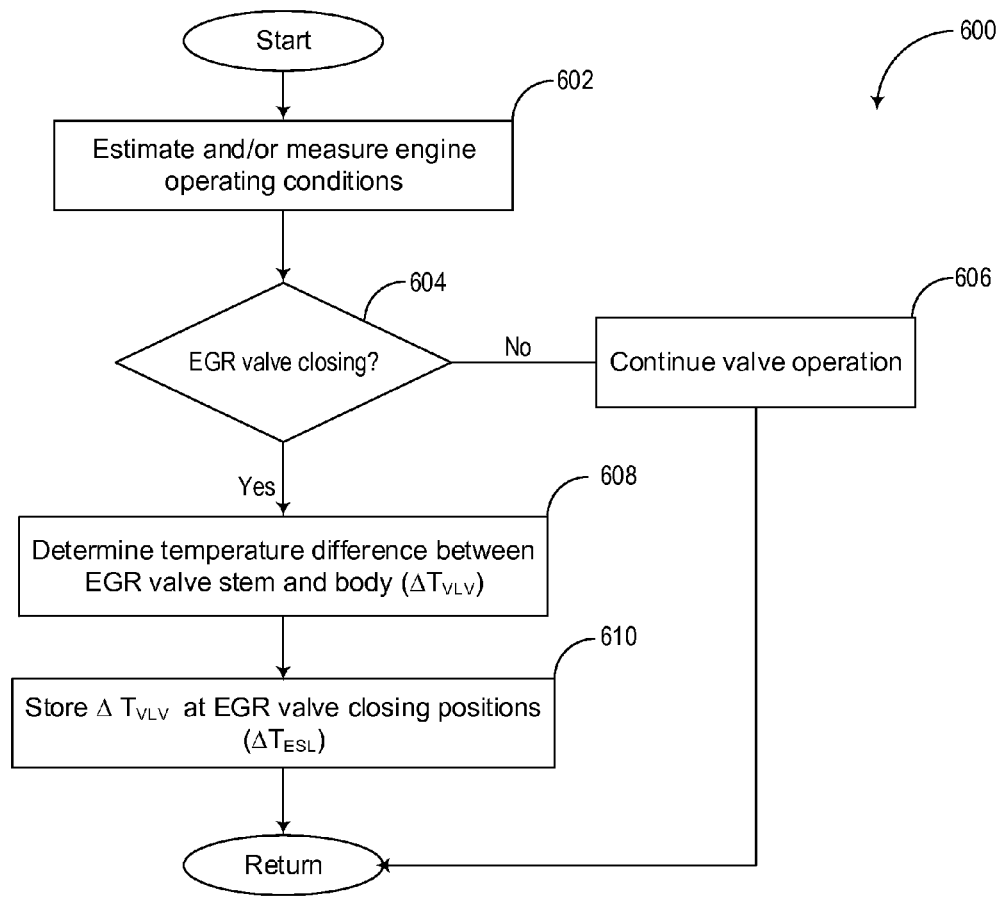
FIG. 6 is a flow chart of a method for learning a difference in temperature between an EGR valve stem and body at an EGR valve closing position.

Moving on to FIG. 6, a method 600 for estimating the difference in temperature between the EGR valve stem and body at a valve closing position is shown (e.g., referred to herein as end-stop learning). Method 600 provides a means for estimating a temperature difference between the EGR valve stem and body when the EGR valve is closed ($\Delta T_{ESL}$). Thus, as described earlier in the method of FIG. 5, the ($\Delta T_{ESL}$) may be used to improve the accuracy of the estimated change in the EGR valve flow area due to thermal expansion of the EGR valve.

Method 600 begins at 602 and the controller estimates and/or measures engine operating conditions. Engine operating parameters may be estimated based on feedback from a plurality of sensors and may include: engine temperature, engine speed and load, intake mass air flow, manifold pressure, EGR valve position, etc.

Based on the engine operating conditions, the controller may then determine if the EGR valve is closing at 604. Specifically the controller may determine if the EGR valve is closing based on the position of the EGR valve as given by a position sensor (e.g., EGR valve lift sensor 131). In one embodiment, the controller may continuously monitor the EGR valve such that it may proceed to 608 at every valve closing event. If the controller determines that the valve is not closing then the controller may proceed to 606. In another embodiment, the controller may not proceed to 608 at every valve closing event. Instead, the controller may only proceed to 608 if the EGR valve is closing and a duration has passed. Otherwise, the controller may proceed to 606. The duration may be a number of valve closing events, time interval, number of engine cycles, etc. Thus, even if the controller detects that the valve is closing, the controller may instead proceed to 606 if the duration has not passed. At 606, the EGR valve position may be modulated based on a desired EGR flow rate as determined by engine operating parameters (e.g., engine temperature, exhaust gas temperature, intake mass air flow, etc.)

However, if at 604 the EGR valve is closing and the duration has passed, then the controller may determine the difference in temperature between the EGR valve stem and body based on the EGR temperature as given by a temperature sensor (e.g., EGR temperature sensor 135). For example, the controller may look up the temperature difference between the EGR valve stem and body as a function of EGR temperature and/or EGR flow and then store that temperature difference as the $\Delta T_{ESL}$. When the EGR valve closes, the delta temperature calculated is used as the value to be stored for $\Delta T_{ESL}$. After determining the $\Delta T_{ESL}$ at 608, the controller may proceed to 610 and store the $\Delta T_{ESL}$ and EGR temperature values determined at 608 in the memory of the controller (e.g., in a look-up table). Thus, the $\Delta T_{ESL}$ values stored in the controller may be accessed to compare to $\Delta T_{VLV}$ values to determine a thermal expansion correction to estimates for the EGR valve flow area as described in the method of FIG. 5.

In this way, a method may include estimating an EGR flow rate based on outputs from a DPOV system and an intake oxygen sensor. Both the DPOV system comprising a delta pressure (DP) sensor and an EGR valve position sensor, and an intake oxygen sensor may be used to give separate estimates of the EGR mass flow rate. Under engine operating conditions where purge is disabled, boost is off, and the intake mass air flow is below a threshold, the intake oxygen sensor may be used to give an estimate of the EGR mass air flow rate. The estimate of the EGR mass air flow rate determined from the intake oxygen sensor output may then be compared to an EGR flow estimate based on outputs of the DPOV system to determine an amount of soot buildup on the EGR valve and thereby provide an estimate of the EGR mass air flow rate with increased accuracy.

The DPOV system may estimate the EGR mass flow rate based on the pressure differential across the valve as measured by the DP sensor, and the area of the EGR valve opening (for EGR flow). The area of the EGR valve opening may be estimated based on the position of the valve as given by a position sensor (e.g., EGR valve lift sensor), a known cross-sectional flow area of the valve, and a thermal expansion correction factor which accounts for the expansion of the valve under a current EGR temperature. The cross-sectional flow area (e.g., opening for EGR flow) of the valve may change depending on the temperature difference between the stem and body of the valve. Thus, the area of the EGR valve opening may be modified based on a change between the temperature difference of the stem and body of the EGR valve when the EGR valve is closed and open and a thermal expansion coefficient.

In this way, the technical effect of determining a corrected EGR flow area based on soot accumulation on the EGR valve (as determined by comparing EGR flow estimates from the intake oxygen sensor and the DPOV system) and thermal expansion or contraction of the EGR valve (as determined by the temperature difference between the stem and body of the EGR valve) is determining a more accurate EGR flow estimate to increase the accuracy of EGR control and additional engine control. Additionally, an amount of soot buildup on an EGR valve may be estimated and used to initiate a valve cleaning routine, or signal to a vehicle operator if the soot level reaches a threshold. By using the EGR flow rate based on the oxygen sensor as a reference point, the DPOV system EGR flow rate estimates may have increased accuracy by accounting for the decreased flow area caused by soot buildup on the EGR valve. Another technical effect is achieved by adjusting the EGR flow rate based on a temperature difference of the stem and body of the EGR valve when the valve is open and closed. The opening of the valve may change depending on the temperature difference between the stem and body of the valve. Thus, the area of the EGR valve opening may be modified based on a change between the temperature difference of the stem and body of the EGR valve when the EGR valve is closed and open and a thermal expansion coefficient. Subsequently, the flow rate of the EGR may be adjusted to more closely match a desired EGR flow rate, such that the efficiency of the engine may be increased.

In another representation, a method for an engine comprises: during selected conditions, comparing a first exhaust gas recirculation (EGR) flow estimated based on an output of an intake oxygen sensor with a second EGR flow estimated based on a pressure difference across an EGR valve; and indicating soot build-up on the EGR valve based on the comparison.

In yet another representation, a method for an engine comprises: during selected conditions, learning a flow area error of an EGR valve based on a difference between EGR flow estimates via an intake oxygen sensor and via a differential pressure over valve (DP) sensor coupled across the EGR valve; and indicating degradation of the EGR valve due to soot based on the learned flow area. The method further comprises during subsequent engine operation when EGR is estimated with a DP sensor, adjusting the DPOV EGR estimate based on the learned flow area error.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
opening an EGR valve, thereby allowing exhaust gas to flow there through; and
indicating soot accumulation on the exhaust gas recirculation (EGR) valve by setting a diagnostic code based on a difference in EGR flow estimated during a first non-boosted engine condition, with an intake oxygen sensor and with a pressure sensor coupled across the EGR valve.

2. The method of claim 1, wherein the difference in EGR flow is a difference between a first EGR flow estimated based on an output of the intake oxygen sensor during the first condition and a second EGR flow estimated with the pressure sensor across the EGR valve during the first condition, wherein the pressure sensor is a differential pressure over valve (DP) sensor, and further comprising estimating the second EGR flow based on an output of the DP sensor and a flow area of the EGR valve, where the flow area of the EGR valve is estimated based on a known cross-section of the EGR valve and an EGR valve position based on an output of an EGR valve position sensor.

3. The method of claim 2, further comprising determining a change in EGR valve flow area based on the difference in EGR flow, an expected EGR valve flow area and the first EGR flow estimated with the intake oxygen sensor during the first condition, the expected EGR valve flow area based on the output of the EGR valve position sensor and an EGR valve lift correction, the EGR valve lift correction learned during an EGR valve end stop and thermal compensation learning routine.

4. The method of claim 3, further comprising determining the EGR valve lift correction based on a change in a temperature difference of a stem and body of the EGR valve between when the valve is open and closed, where the temperature difference of the stem and body of the EGR valve is based on an EGR temperature measured proximate to the EGR valve and EGR flow.

5. The method of claim 3, further comprising indicating soot accumulation on the EGR valve based on the change in EGR valve flow area increasing above a threshold level.

6. The method of claim 3, further comprising indicating soot accumulation on the EGR valve based on a rate of change in the change in EGR valve flow area increasing above a threshold rate.

7. The method of claim 3, further comprising determining a corrected EGR valve flow area based on the determined change in EGR valve flow area and the expected EGR valve flow area.

8. The method of claim 7, further comprising during a second condition when EGR flow is estimated with the DP sensor, estimating EGR flow based on the output of the DP sensor and the corrected EGR valve flow area.

9. The method of claim 8, wherein the second condition includes one or more of when the engine is boosted, when fuel canister purge is enabled, and when mass air flow to the engine is greater than a threshold level.

10. The method of claim 1, wherein the first condition further includes when fuel canister purge is disabled and mass air flow to the engine is less than a threshold level.

11. The method of claim 1, further comprising adjusting engine operation based on EGR flow estimated with the intake oxygen sensor and not the pressure sensor coupled across the EGR valve when the engine is not boosted, fuel canister purge is disabled, and mass air flow to the engine is below a threshold level.

12. The method of claim 1, further comprising initiating a cleaning routine responsive to the indication of soot accumulation.

13. A method for an engine, comprising:
opening an EGR valve, thereby allowing exhaust gas to flow there through; and
during selected conditions:
comparing a first exhaust gas recirculation (EGR) flow estimated based on an output of an intake oxygen sensor with a second EGR flow estimated based on a pressure difference across the EGR valve; and
indicating soot build-up on the EGR valve based on the comparison by setting a diagnostic code.

14. The method of claim 13, wherein comparing the first EGR flow with the second EGR flow includes learning a flow area error of the EGR valve based on a difference between the first EGR flow and second EGR flow.

15. The method of claim 14, wherein indicating soot build-up on the EGR valve includes indicating degradation of the EGR valve due to soot based on the learned flow area error increasing above a threshold.

16. The method of claim 14, further comprising during subsequent engine operation when EGR flow is estimated based on the pressure difference across the EGR valve, adjusting the EGR flow estimate based on the learned flow area error.

17. The method of claim 13, wherein the pressure difference across the EGR valve is measured via a differential pressure over valve (DP) sensor coupled across the EGR valve.

18. The method of claim 13, wherein indicating soot build-up on the EGR valve includes one or more of setting a diagnostic code, initiating an EGR valve cleaning routine, and alerting a vehicle operator that the EGR valve is degraded and needs servicing and wherein the selected conditions include when the engine is not boosted, fuel canister purge is disabled, and mass air flow is less than a threshold level.

19. A system for an engine, comprising:
a turbocharger with an intake compressor and an exhaust turbine;
a low-pressure exhaust gas recirculation (EGR) passage coupled between an exhaust passage downstream of the exhaust turbine and an intake passage upstream of the intake compressor, the low-pressure EGR passage including an EGR valve and differential pressure (DP) sensor for measuring EGR flow;
an intake oxygen sensor disposed in an intake of the engine downstream from the low-pressure EGR passage; and
a controller with computer-readable instructions for indicating flow-area degradation of the EGR valve based on a difference between a first EGR flow estimate based on an output of the DP sensor and a second EGR flow estimate based on an output of the intake oxygen sensor during engine operation responsive to fuel canister purge disabled, boost disabled, and mass air flow below a threshold level.

20. The system of claim 19, wherein the intake oxygen sensor is further positioned in an intake manifold of the engine and wherein the computer-readable instructions further include instructions for adjusting a third EGR flow estimate, the third EGR flow estimate based on the output of the DP sensor during engine operation when one or more of fuel canister purge is enabled, boost is enabled, and mass air flow is greater than the threshold level, based on the difference between the first EGR flow estimate and the second EGR flow estimate.

* * * * *